US011371569B2

(12) United States Patent
Cioc

(10) Patent No.: US 11,371,569 B2
(45) Date of Patent: Jun. 28, 2022

(54) SELECTABLE ONE-WAY CLUTCH WITH COMMON COIL UNIT AND AXIALLY MOVEABLE ARMATURE FOR ACTIVE STRUT ACTUATION

(71) Applicant: MAGNA POWERTRAIN, INC., Concord (CA)

(72) Inventor: Adrian Cioc, North York (CA)

(73) Assignee: MAGNA POWERTRAIN INC., Concord (CA)

( * ) Notice: Subject to any disclaimer, the term of this patent is extended or adjusted under 35 U.S.C. 154(b) by 0 days.

(21) Appl. No.: 17/278,363

(22) PCT Filed: Sep. 27, 2019

(86) PCT No.: PCT/CA2019/000135
§ 371 (c)(1),
(2) Date: Mar. 22, 2021

(87) PCT Pub. No.: WO2020/061673
PCT Pub. Date: Apr. 2, 2020

(65) Prior Publication Data
US 2021/0348658 A1    Nov. 11, 2021

Related U.S. Application Data

(60) Provisional application No. 62/737,507, filed on Sep. 27, 2018.

(51) Int. Cl.
F16D 41/16    (2006.01)
F16D 27/102   (2006.01)
F16D 41/04    (2006.01)

(52) U.S. Cl.
CPC ........... *F16D 41/16* (2013.01); *F16D 27/102* (2013.01); *F16D 41/04* (2013.01)

(58) Field of Classification Search
CPC ........ F16D 41/16; F16D 41/04; F16D 41/084; F16D 41/12; F16D 27/10; F16D 27/102
See application file for complete search history.

(56) References Cited

U.S. PATENT DOCUMENTS 8,646,587 B2    2/2014  Kimes
10,036,433 B2   7/2018  Trent et al.
(Continued)

FOREIGN PATENT DOCUMENTS

WO    2018152616 A1    8/2018
WO    2018157236 A1    9/2018

*Primary Examiner* — Ernesto A Suarez
*Assistant Examiner* — Lori Wu
(74) *Attorney, Agent, or Firm* — Dickinson Wright PLLC

(57) ABSTRACT

A bi-directional clutch assembly includes an outer race defining first and second strut pockets, an inner race defining ratchet teeth, a passive one-way clutch including at least two passive struts each supported in a corresponding first strut pocket for pivotal movement relative to the ratchet teeth, passive strut springs for normally biasing the passive struts into engagement with the ratchet teeth on the inner race, and a selectable one-way clutch having at least one active strut supported in the second strut pocket for pivotal movement between a non-deployed position disengaged from the ratchet teeth and a deployed position engaged with the ratchet teeth, and an armature ring fixed for rotation with the outer race and axially moveable between a non-actuated position and an actuated position, in which a strut engagement feature moves the active strut from its non-deployed position to its deployed position.

15 Claims, 22 Drawing Sheets

(56) References Cited

U.S. PATENT DOCUMENTS

| | | | |
|---|---|---|---|
| 10,066,679 B2 | 9/2018 | Cioc et al. | |
| 2016/0201738 A1* | 7/2016 | Kimes ..................... | F16D 27/00 |
| | | | 192/84.8 |
| 2018/0038425 A1* | 2/2018 | Kimes ................... | F16D 27/004 |

* cited by examiner

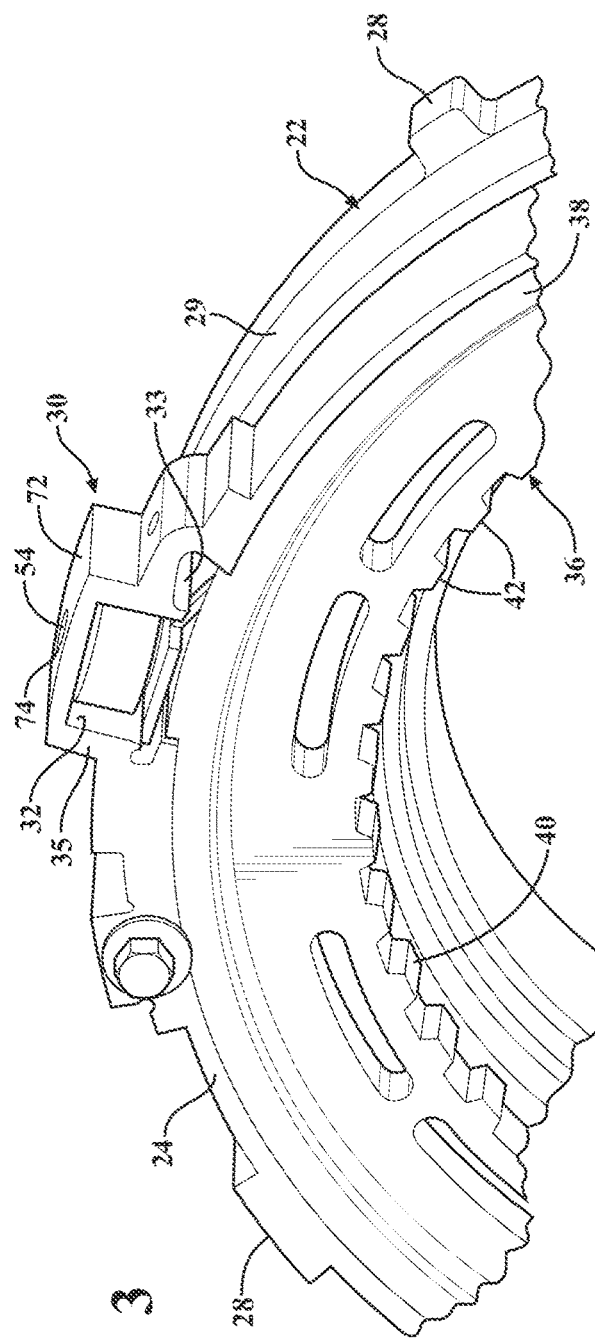

SELECTABLE ONE-WAY CLUTCH WITH COMMON COIL UNIT AND AXIALLY MOVEABLE ARMATURE FOR ACTIVE STRUT ACTUATION

CROSS-REFERENCE TO RELATED APPLICATIONS

The present application is a U.S. National Stage of International Application. No. PCT/CA2019/000135, filed on Sep. 27, 2019, which claims the benefit of U.S. Provisional Patent Application No. 62/737,507, filed Sep. 27, 2018, titled "Selectable One-Way Clutch With Common Coil Unit and Axially Moveable Armature For Active Strut Actuation," the entire content of which is hereby incorporated by reference in its entirety.

FIELD OF THE INVENTION

The present disclosure is generally related to overrunning coupling devices such as one-way clutches or brakes and, more specifically to selectable one-way coupling (SOWC) devices having an electromagnetic actuator. The present disclosure is further related to use of such SOWC devices in motor vehicle driveline applications to provide a disconnect feature when equipped within electric drive axle and/or electric transaxles as well as when equipped within drive axle assemblies.

BACKGROUND OF THE INVENTION

This section provides background information related to the present disclosure which is not necessarily prior art.

Transmissions provide a plurality of forward and reverse speed or gear ratios by selectively actuating one or more clutches and/or brakes to establish a torque-transmitting drive connection between a transmission input and a transmission output for supplying motive power (i.e., drive torque) from a powertrain to a driveline in a motor vehicle. One type of brake or clutch widely used in transmissions is an overrunning coupling device, commonly referred to as a one-way clutch (OWC), which overruns when one of its races (in radial coupling configuration) or one of its drive plates (in axial coupling configurations) rotates in a first (i.e., freewheel) direction relative to the other race or drive plate, and engages or locks in a second (i.e., lockup) direction. Such conventional one-way clutches provide no independent control over their modes of operation, that is to say whether they lockup or freewheel in both directions and are commonly referred to as passive one-way clutches. Thus, basic one-way clutches provide a "locked" mode in one rotary direction and a "freewheel" mode in the opposite direction based on the direction that the drive torque is being applied to the input race or drive plate.

There are however, requirements in modern transmissions where a "controllable" overrunning coupling device, commonly referred to as a selectable one-way clutch (SOWC), can be selectively controlled to provide additional functional modes of operation. Specifically, a selectable one-way clutch may further be capable of providing a freewheel mode in both rotary directions until a command signal (i.e., from the transmission controller) causes a power-operated actuator to shift the coupling device into its lockup mode. Thus, a selectable one-way clutch may be capable of providing a drive connection between an input member and an output member in one or both rotational directions and it may also be operable to freewheel in one or both directions.

It is also known in modern transmissions to integrate a passive one-way clutch and a selectable one-way clutch into a combined coupling device, commonly referred to as a bi-directional clutch.

In addition to traditional automotive transmissions, significant development activity is currently directed to hybrid/ electric transaxles and axles which are capable of providing the motor vehicle with an electric drive mode. In such devices, a mechanical coupling device is employed to selectively disconnect an electric motor from a geartrain to prevent unnecessary drag when the electric drive mode is not selected, and conversely to drivingly connect the electric motor to the geartrain when the electric drive mode is selected. Currently, these mechanical coupling devices, commonly referred to as "disconnect" clutches, are of the positive-engagement dog-clutch configuration and are only capable of providing ON/OFF functionality. Such dog-type disconnect clutches typically have high backlash angles, require very high release forces to disengage, and do not allow a ratcheting (i.e. one-way freewheeling) behavior to accommodate a unidirectional overrun condition.

In view of the above, a need exists to continue development of new and improved overrunning coupling devices that advance the art and provide enhanced functionality. Specifically, a need exists to develop alternative disconnect clutches providing reduced backlash tooth engagement and which are capable of additional modes of operation, such as a freewheeling mode.

SUMMARY

It is an aspect of the present disclosure to provide a SOWC device configured to provide a disconnect feature when installed in a motor vehicle driveline.

It is a related aspect of the present disclosure to configure the SOWC device as an axle disconnect clutch to provide the disconnect feature in a drive axle assembly of AWD/4WD vehicles.

It is another related aspect to configure the SOWC device as a motor disconnect clutch to provide the disconnect feature in an electric transaxle and/or electric drive axle to selectively connect/disconnect the electric motor from the gear train.

In accordance with these and other aspects, a bi-directional clutch assembly is provided for use in motor vehicles to provide a disconnect feature. The bi-directional clutch assembly comprises: a rotary input; a rotary output; an outer race fixed for rotation with one of the input and the output and defining first and second strut pockets; an inner race fixed for rotation with the other of the input and the output and defining ratchet teeth; a passive one-way clutch including at least two passive struts each supported in a corresponding first strut pocket for pivotal movement relative to the ratchet teeth; passive strut springs for normally biasing the passive struts into engagement with the ratchet teeth on the inner race to define a Freewheel/Locked mode of operation; and a selectable one-way clutch having an annular coil unit fixed to a stationary member, at least one active strut supported in the second strut pocket for pivotal movement between a non-deployed position disengaged from the ratchet teeth and a deployed position engaged with the ratchet teeth, and an armature ring fixed for rotation with the outer race and axially moveable between a non-actuated position and an actuated position in response to energization of the coil unit, wherein the armature ring has a strut engagement feature configured to move the active strut from its non-deployed position to its deployed position in response to movement of the armature ring from its non-actuated position to its actuated position to define a Lock-Lock mode of operation.

In one aspect, a bi-directional clutch assembly includes: a rotary input; a rotary output; an outer race fixed for rotation with one of the input and the output and defining first and second strut pockets; an inner race fixed for rotation with the other of the input and the output and defining ratchet teeth; a passive one-way clutch including at least two passive struts each supported in a corresponding first strut pocket for pivotal movement relative to the ratchet teeth; passive strut springs for normally biasing the passive struts into engagement with the ratchet teeth on the inner race; and a selectable one-way clutch including at least one active strut supported in a corresponding second strut pocket for pivotal movement between a non-deployed position disengaged from the ratchet teeth and a deployed position engaged with the ratchet teeth, wherein the at least one active strut is biased toward the non-deployed position; and an axially moveable armature ring moveable between a non-actuated position and an actuated position, wherein movement of the armature ring to the actuated position causes movement of the at least one active strut to the deployed position.

In one aspect, the clutch assembly includes an annular coil unit fixed to a stationary member, wherein the armature ring moves axially to the actuated position in response to energization of the annular coil unit.

In one aspect, the armature ring is fixed for rotation with the outer race.

In one aspect, the armature ring includes a strut engagement feature, wherein the strut engagement feature is configured to contact the at least one active strut in response to movement of the armature ring to the actuated position, wherein contact by the strut engagement feature with the at least one active strut causes the active strut to move to the deployed position.

In one aspect, the at least one active strut in the deployed position blocks relative rotation between the inner race and the outer race in a first direction, and the passive struts block relative rotation between the inner race and the outer race in a second direction that is opposite the first direction to define a Locked/Locked mode of operation.

In one aspect, the at least one active strut in the non-deployed position defines a Freewheel/Locked mode of operation, where the passive struts block relative rotation in the second direction and allow relative rotation in the first direction.

In one aspect, the at least one active strut includes a corresponding active strut spring for biasing the at least one active strut to the non-deployed position.

In one aspect, the passive strut spring is offset relative to the pivot axis of the passive strut to provide a tail-heavy configuration.

In one aspect, the armature ring is biased toward the non-actuated position.

In one aspect, the coil is disposed radially outward from the outer race.

In one aspect, the armature ring includes a ring segment overlying the coil and a flange segment, wherein the strut engagement feature is attached to the flange segment.

In one aspect, the strut engagement feature includes a ramped surface configured to contact the at least one active strut.

In another aspect, a method of operating a bi-directional clutch assembly is provided. The method includes the steps of energizing an annular coil; moving an armature ring axially from a non-actuated position to an actuated position in response to energizing the annular coil; contacting at least one active strut with a strut engagement feature of the armature ring and, in response thereto, pivoting the at least one active strut from a non-deployed position into a deployed position in which the active strut engages ratcheting teeth of an inner race. The active strut is supported in an active strut pocket formed in an outer race for pivotal movement between the deployed position and the non-deployed position. In the deployed position, the at least one active strut blocks relative rotation between the inner race and the outer race in a first direction. The bi-directional clutch assembly further includes at least two passive struts supported in passive strut pockets formed in the inner race and biased into engagement with the ratcheting teeth, wherein the at least two passive struts block relative rotation between the inner race and the outer race in a second direction that is opposite the first direction. When the at least one active strut is in the deployed position, the bi-directional clutch assembly is a Locked/Locked mode of operation in which relative rotation is blocked in both the first and second direction, and when the at least one active strut is in the non-deployed position, the bi-directional clutch assembly is in a Freewheel/Locked mode of operation in which relative rotation is blocked in the second direction by the passive struts and allowed in the first direction.

In one aspect, the method further includes de-energizing the annular coil and, in response thereto, moving the armature from the actuated position to the non-actuated position, wherein the armature is biased toward the non-actuated position, and pivoting the at least one active strut from the deployed position to the non-deployed position, wherein the at least one active strut is biased toward the non-deployed position.

In one aspect, the armature is fixed for rotation to the outer race, and the annular coil is fixed to a stationary member.

These and other features and advantages of the present invention will become more readily appreciated when considered in connection with the following detailed description and appending drawings.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 3 is an assembled partial isometric view of the clutch assembly of FIG. 1 showing an arrangement for installing the electromagnetic actuator in an axially directed configuration;

FIGS. 3A and 3B are cross-sectional side views of the electromagnetic actuator of FIG. 3 with a strut of an active strut assembly shown in locked and unlocked positions, respectively, in response to respective energized and de-energized states of the electromagnetic actuator;

DESCRIPTION OF THE ENABLING EMBODIMENTS

Figure 1:
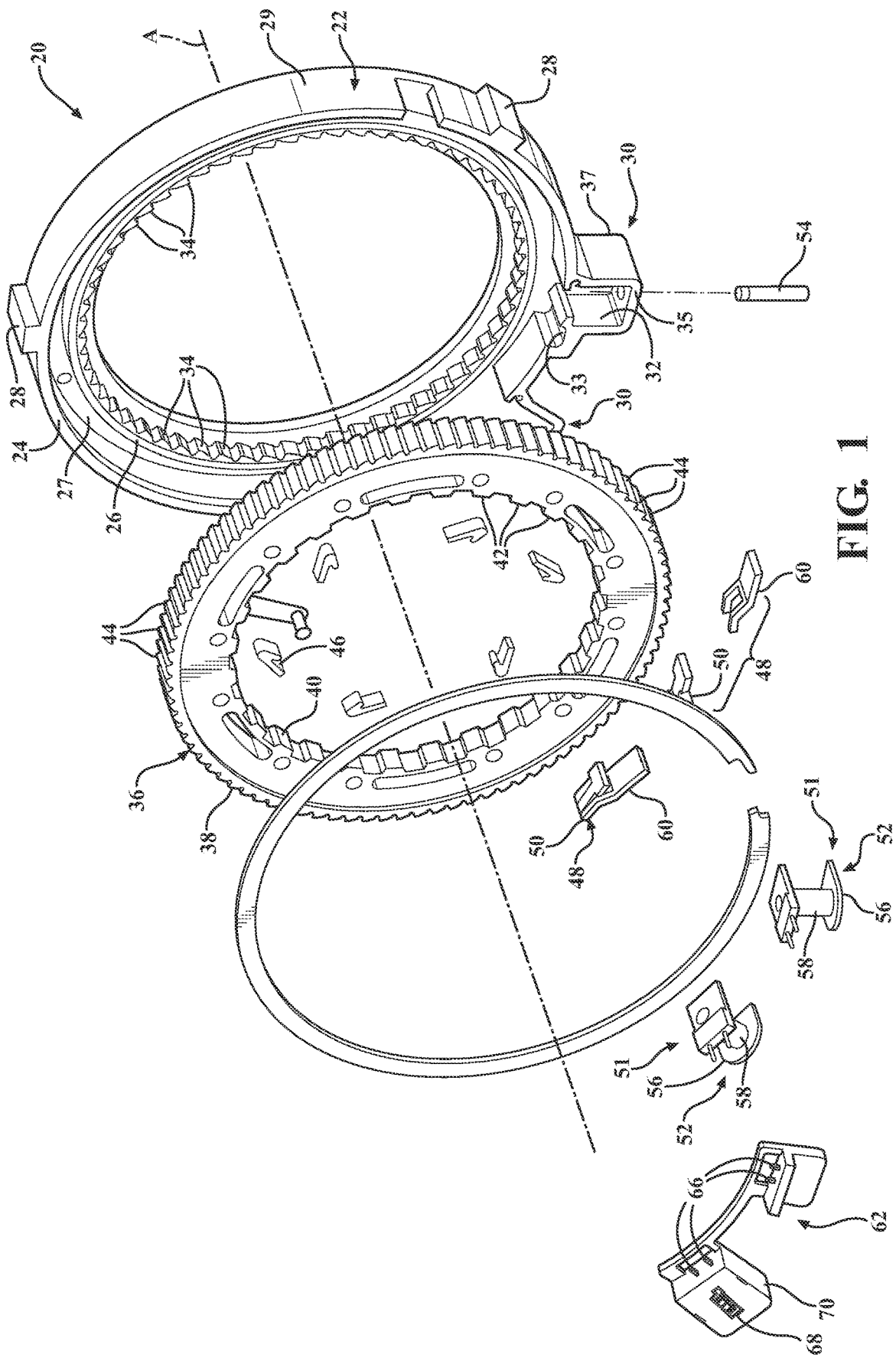
FIG. 1 is an exploded isometric view of a bi-directional clutch assembly configured to include a passive one-way clutch and a selectable one-way clutch having an electromagnetic actuator and a lead frame with an integrated safety switch in accordance with an aspect of the disclosure.

Example embodiments will now be described more fully with reference to the accompanying drawings. In general, each embodiment is directed to an overrunning coupling device (i.e. brake and/or clutch) having at least a controllable one-way locking device including a moveable locking component (i.e. sprag, strut, etc.) that is controlled, at least in part, via an electromagnetic actuator. Thus, the overrunning coupling device transmits torque mechanically but is actuated via an electrical actuation system. It is to be recognized the example embodiments only are provided so that this disclosure will be thorough, and will fully convey the scope, which is ultimately defined by the claims, to those who are skilled in the art. Numerous specific details are set forth, such as examples of specific components, devices, and methods, to provide a thorough understanding of embodiments of the present disclosure. It will be apparent to those skilled in the art that certain specific details need not be employed, that example embodiments may be embodied in many different forms, and that neither should be construed to limit the scope of the disclosure or the claims. In some example embodiments, well-understood processes, well-understood device structures, and well-understood technologies are not described in detail.

Referring to FIGS. 1, 3 and 3A-3B, wherein like numerals indicate corresponding parts throughout the several views, unless otherwise stated, a bi-directional clutch assembly 20 is generally shown. As will be detailed in further detail below, bi-directional clutch assembly 20 generally includes a stationary outer race, a rotatable inner race, a passive one-way clutch having a plurality of passive struts, and a selectable one-way clutch having at least one active strut assembly and a respective electromagnetic actuator associated with each active strut assembly. The clutch assembly 20 includes an outer housing presenting an outer race 22 that extends annularly about an axis A. It should be recognized the outer housing/outer race 22 can be constructed as a single piece of material or as separate pieces of material and subsequently fixed to one another, as will be appreciated by one skilled in the art. The outer race 22 includes an outer ring segment 24 and an inner ring segment 26 that are spaced radially from one another and interconnected via a radial web segment 27. The outer ring segment 24 may have a great axial width than the inner ring segment 26. The outer ring segment 24 presents a plurality of outer lugs 28 or projections that extend radially outwardly from an outer surface 29 of the outer ring segment 24 for mating with a first component. The first component can be a stationary component (such as a housing of a transmission) or a rotary component (such as a shaft).

The outer ring segment 24 further presents at least one, and shown as a pair of coil assembly support protrusions, referred to hereafter simply as protrusions 30, that extend radially outwardly from the outer surface 29 of the outer ring segment 24. As shown, the protrusions 30 are disposed generally adjacent each other and spaced apart circumferentially. Put another way, the protrusions 30 are spaced apart less than 180 degrees from each other, such that they are disposed on the same radial side of the outer ring segment 24. Each of the protrusions 30 forms a radially extending actuator pocket 32 and a strut pocket 33. The respective pockets 32, 33 are shown as being open along one side surface 35, and closed along an opposite side surface 37 by a wall of the protrusion 30, thereby allowing for the axial insertion of a further component, as further described below. It should be appreciated that more or fewer protrusions 30 could be provided by the outer ring segment 24, and may be spaced apart from each other at different circumferential distances. The inner ring segment 26 presents a plurality of inner ramp surfaces, hereinafter referred to as inner ratchet teeth 34, that extend radially inwardly and are evenly distributed about the axis A to be disposed over substantially the entire inner circumference of the inner ring segment 26.

The clutch assembly 20 further includes an annular inner race 36 that also extends annularly about the axis A. The inner race 36 has an outer rim 38 and an inner rim 40 that are spaced radially from one another by a radial web segment 41. Upon assembly, the outer rim 38 is disposed radially between the outer and inner ring segments 24, 26 of the outer race 22, and the inner rim 40 is disposed radially inwardly from the inner ring segment 26 of the outer race 22. Thus, upon assembly, the inner race 36 may be received within the outer ring segment 24 in an axial direction. The inner rim 40 of the inner race 36 presents a plurality of inner lugs 42 that extend radially inwardly for mating with a second component (typically a rotary component). Commonly, lugs 42 interconnect a shaft or clutch plates for conjoint rotation with inner race 36. As shown, the lugs 42 are evenly distributed about the entire inner circumference of the inner rim 40. Further, the outer rim 38 of the inner race 36 presents a plurality of outer ramp surfaces, hereinafter referred to as outer ratchet teeth 44, that extend radially outwardly and are evenly distributed about the axis A.

The passive one-way clutch includes a plurality of locking elements, also referred to as passive struts 46, which are pivotally supported in strut apertures formed in the inner race 36 for pivoting between a locking position and an unlocking position. In the locking position, the passive struts 46 engage the inner ratchet teeth 34 of the outer race 22 for connecting the outer and inner races 22, 36 to one another during counter-clockwise rotation of the inner race 36 relative to the outer race 22. Therefore, engagement by one or more of the passive struts 46 prevents relative displacement of the outer and inner races 22, 36 in the counter-clockwise direction. However, the passive struts 46 still allow relative displacement between the outer and inner races 22, 36, i.e., overrun, in the clockwise direction when located in the locked position since they ratchet over the ramped profile of the inner ratchet teeth 34. In the unlocked position, the passive struts 46 are radially spaced from the inner ratchet teeth 34 of the outer race 22, therefore also allowing counter-clockwise rotation of the inner race 36 relative to the outer race 22. Thus, when the passive struts 46 are in the locked position, relative rotation is allowed in a single direction, and when the passive struts are in the unlocked position, relative rotation is allowed in both rotational directions.

In association with the selectable one-way clutch, an active strut assembly 48 is provided, a portion of which is received by each of the strut pockets 33 in the outer ring segment 24. Each of the active strut assemblies 48 includes an active strut 50 that is selectively pivotal between a locked and an unlocked position. In the locked position (FIG. 3A), the active strut 50 is deployed so as to lockingly engage the outer ratchet teeth 44 of the inner race 36, thereby locking the outer and inner races 22, 36 to one another during clockwise movement of the inner race 36 relative to the outer race 22. However, the active strut 50 still allows relative displacement between the outer and inner races 22, 36, i.e., overrun, in the counter-clockwise direction. In the unlocked position (FIG. 3B), the active strut 50 is radially spaced from the outer ratchet teeth 44, allowing the inner and outer races 22, 36 to rotate relative to one another. Furthermore, each of the active strut assemblies 48 includes an armature 60 that is disposed adjacent to, and in operable communication with, the active strut 50 for providing the selective pivotal movement of the active strut 50. Thus, when in the locked position of the active strut 50, rotation is allowed in one direction, and in the unlocked position, rotation is allowed in both directions.

The selectable one-way clutch also includes an electromagnetic actuator 51, which is associated in operable communication with each active strut 50. Thus, as illustrated, two actuators 51 are provided. Each electromagnetic actuator 51 includes a coil assembly 52. The coil assembly 52 is mounted in the actuator pocket 32 and is radially spaced from the active strut 50 and armature 60. The coil assembly 52 includes an elongate pole piece or core 54 of a paramagnetic or ferromagnetic, magnetically permeable material, shown by way of example and without limitation as being generally cylindrical, a bobbin 56 disposed about the core 54, and at least one coil 58 spirally wrapped about the bobbin 56. Furthermore, the armature 60 of the active strut assembly 48 is a magnetic component disposed between the active strut 50 and the core 54/coil 58. The armature 60 pivots toward the core 54, due to magnetic attraction caused via energization of the coil assembly 52, and thus providing the pivotal movement of the active strut 50 in response to energization of the coil 58 via electric current.

More specifically, when electric voltage and/or current are applied to the coil 58, the coil 58 becomes an electromagnet producing an electric field (or magnetic flux). The flux flows outwards in all directions and transfers through the small preset air gap G (FIG. 3B) between the armature 60 and core 54, which extends through a central through passage of the bobbin 56 of the coil assembly 52. The core 54 becomes selectively magnetized by the energized coil 58, thereby attracting and pivoting the magnetically attracted metallic armature 60 towards the core 54. The resulting pivoting motion of the armature 60 forces the active strut 50 to mechanically deploy radially inwardly due to the linkage between the active strut 50 and the armature 60. The active strut 50 and the armature 60 are pivotable relative to each other, such that pivoting of the armature will cause a pivotal reaction movement of the active strut 50 into the locked position. On deployment, the active strut 50 moves from its unlocked position (FIG. 3B) to its locked position (FIG. 3A) where it locates itself against one of the outer ratchet teeth 44 of the inner race 36, effectively locking the inner race 36 from rotating clockwise relative to the outer race 22. Disengagement occurs as voltage and/or current is removed from the coil assembly 52, wherein the core 54 is selectively and suddenly demagnetized, thus releasing the armature 60 from being magnetically attracted to the core 54 of the coil assembly 52. A biasing spring 61 is positioned within the strut pocket 33 between an end portion of the active strut 50 and the outer race 22, causing the active strut 50 to suddenly pivot back to its unlocked position upon de-energization of the coil assembly 52 and demagnification of the core 54. Put another way, the active strut 50 is biased to the unlocked state.

It should be appreciated that the arrangement of the armature 60, active strut 50, and coil assembly 52 can act to apply a locking force in a radial direction (as shown in FIG. 1) or an axial direction, depending on the layout and/or requirements of the clutch assembly 20. Radial stacked clutch assembly 20 designs offer packaging advantages over their axial counterparts in situations where axial space is tight, e.g., in automatic transmissions. Further, radially applied clutches transmit driving torque directly outwards to be grounded against the transmission housing without the fear of forces being directed axially which could cause problems for the sizing of other system components to compensate for axial force.

Figure 2:
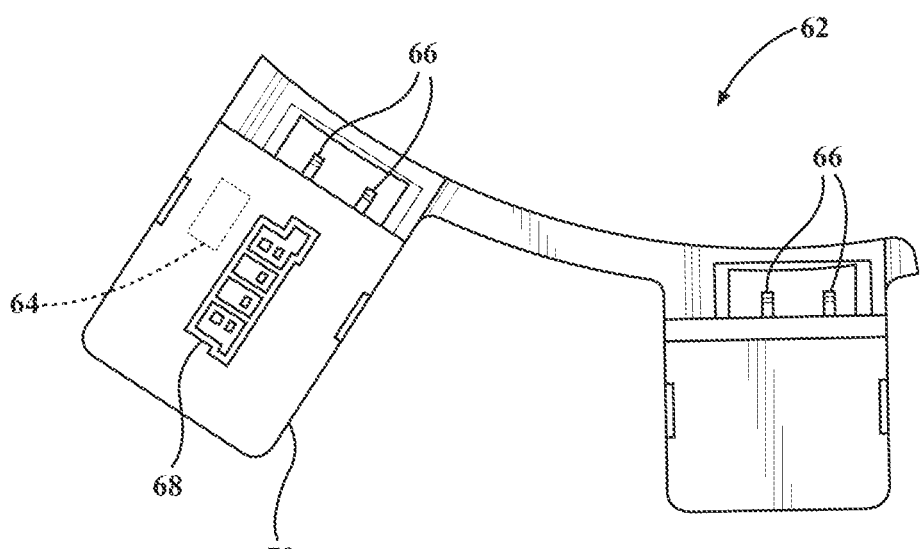
FIG. 2 is a front view of the lead frame and the integrated safety switch of FIG. 1.

As shown in FIGS. 1 and 2, a lead frame 62 is attached to each of the electromagnetic actuators 51 for electrically connecting the coils 58 to one another for simultaneously energizing the coils 58. It should be appreciated that the lead frame 62 could connect any number of coils 58, depending on the number of active strut assemblies 48 provided. A printed circuit board (PCB) 64 is attached to the lead frame 62 for selectively controlling the energization of the coils 58. The PCB 64 is disposed radially and axially adjacent to one of the coils 58. The lead frame 62 further includes at least one power output contact 66 that is disposed radially and axially adjacent to each of the coils 58 for electrically connecting to the coils 58 to provide power to the coils 58. Any number of power contacts 66 could be utilized to power any number of coils 58. Any suitable connection can be utilized to connect the power output contact 66 and the coils 58. Furthermore, at least one wire (not shown) extends between the circuit board 64 and each of the power output contacts 66 for electrically connecting the circuit board 64 and the power output contacts 66. The lead frame 62 also includes connection interface 68 for establishing an electrical connection between the printed circuit board 64 and an external control module, such as a (TCM) or a powertrain control module (PCM) for transmitting data to the PCB 64 and to power the PCB 64. Additionally, the lead frame 62 includes a plastic encapsulation or casing 70 that is disposed about the PCB 64 and the electronics for protecting the PCB 64 and the electronics for allowing the lead frame 62 to be submerged in automatic transmission fluid (ATF) and operate in −40 C to +140 C temperatures. It should be appreciated that the aforementioned configuration of the lead frame 62 and associated components provide a low-cost, modular solution that provides for a more simplified manufacturing process and assembly.

Referring to FIGS. 3, 3A and 3B, an example embodiment of the protrusions 30, shows the open side surface 35 defines the actuator pocket 32 which is configured for axially receiving the coil assembly 52. Furthermore, a radially outwardly facing outer wall 72 of the protrusion 30 provides a through passage, also referred to simply as orifice 74, that extends radially inwardly into the actuator pocket 32. In this embodiment, coil 58 and bobbin 56 are axially disposed and press fit into the actuator pocket 32 through the open side surface 35. Once in position in the actuator pocket 32, which extends radially inwardly from the outer wall 72, the core 54 is pressed radially inwardly through the orifice 74 and through a central through passage of the bobbin 56 until it reaches a predetermined, preset location which sets the magnetic gap G between an armature 60 and the free end of the core 54. The core 54 attains a press fit against an inner surface 75 that defines and bounds the through passage of the bobbin 56, thereby being fixed against movement therein. The core 54 can further be press fit in the through passage of the bobbin 56, or configured in a clearance fit therein. FIG. 3A shows an active strut 50 in the locked position as a result of energization of the coil assembly 52 and FIG. 3B shows the active strut 50 in the unlocked position as a result of de-energizing the coil assembly 52.

Figure 4A:
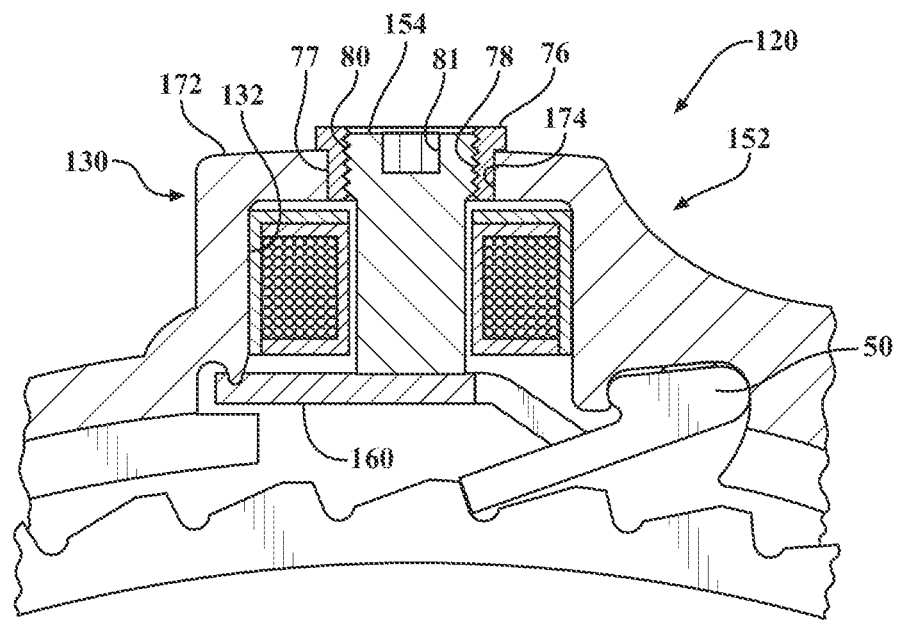
FIGS. 4A and 4B are similar views to FIGS. 3A and 3B but show an electromagnetic actuator constructed in accordance with another aspect of the present disclosure.
Figure 4B:
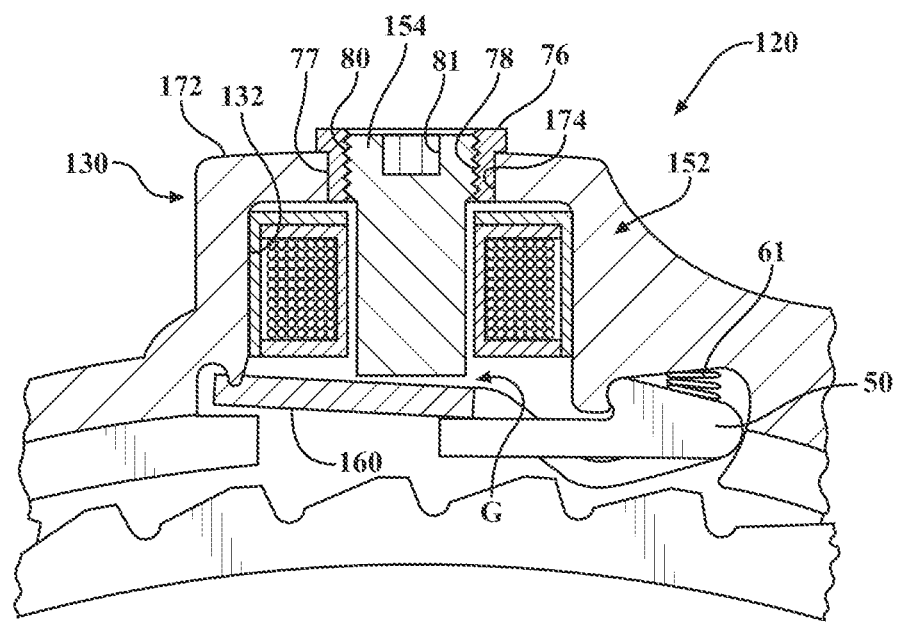

Referring to FIGS. 4A-4B, another example embodiment of a portion of a clutch assembly 120, similar to that discussed above with regard to FIGS. 3, 3A and 3B, is shown, wherein the same reference numerals, offset by a factor of 100, are used to identify like components and features. The coil assembly 152 is axially disposed and press fit into the respective actuator pockets 132, as discussed above; However, rather than directly fixing and press fitting the core 154 into an orifice 174 in an outer wall 172 of the protrusion 130, the core 154 is operably fixed in the orifice 174 in the outer wall 172 via a hollow adaptor plug, also referred to as nut 76. The nut 76 may be fixed in the orifice 174 of the protrusion, and then, the core 154 is disposed through the nut 76 and fixed thereto, whereupon the core 154 is readily adjusted to provide the desired gap G between the free end of the core 154 and the armature 160. The nut 76 is provided having an outer surface 77 configured for fixation within the orifice 174, such as via at least one of press fit, bonding agent, weld joint, threaded engagement, or other suitable mechanical and/or adhesion fixation mechanism. The nut 76 further includes a threaded through passage 78 configured for threaded engagement with an externally threaded portion 80 of the core 154, shown as a threaded fastener end portion 80. To facilitate threading the core 154 into the nut 76, the fastener end portion 80 can be provided with a tool receptacle pocket 81, wherein the pocket 81 can be configured for engagement with any standard tool drive feature, as is known in the art of fasteners. When threading the core 154 into engagement with the nut 76, the gap G between the free end of the core 154 and the armature 160 can be precisely set, as desired, such as by threading the free end of the core 154 into abutment with the armature 160, and then reverse threading and backing the core 154 radially away from the armature 160 a set distance, which can be readily derived by knowing the pitch angle of the threads on the nut 76 and core 154, by way of example and without limitation. Upon fixing the core 154 in position, the core 154 can remain free from direct attachment with the coil 158 and bobbin 156, and thus, is disposed in a clearance fit therewith, which in turn allows for readily simple adjustment and replacement of the core 154 as desired without effect on either the coil 158 or bobbin 156. For example, if the core 154 is damaged, the core 154 may be removed and repaired and/or replaced. Additionally, or alternatively, if the gap G needs to be modified, the core 154 may be adjusted.

Figure 5:
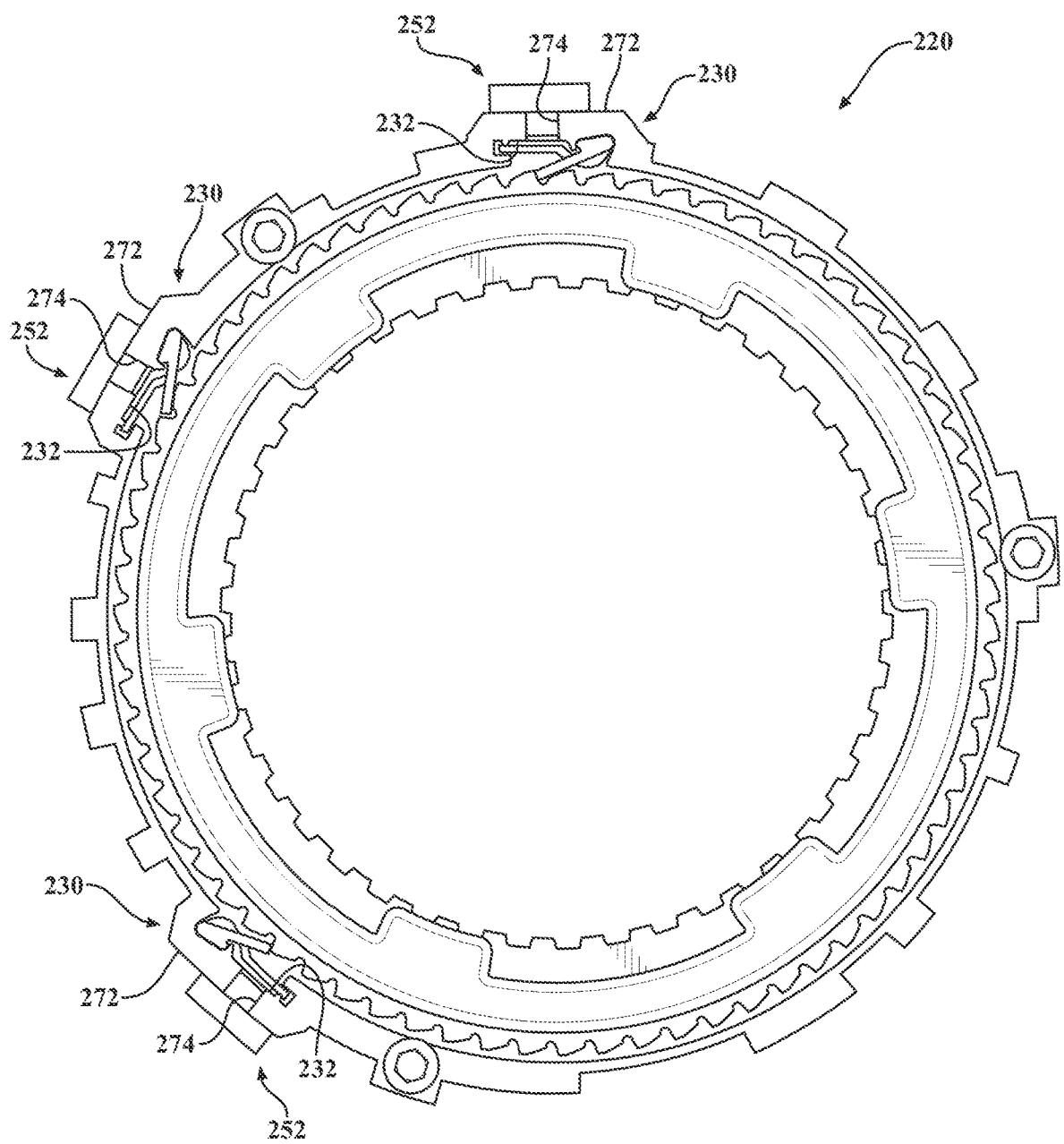
FIG. 5 illustrates a clutch assembly having a selectable one-way clutch with a press-fit electromagnetic actuator associated with the active strut assembly in accordance with another aspect of the present disclosure.
Figure 5A:
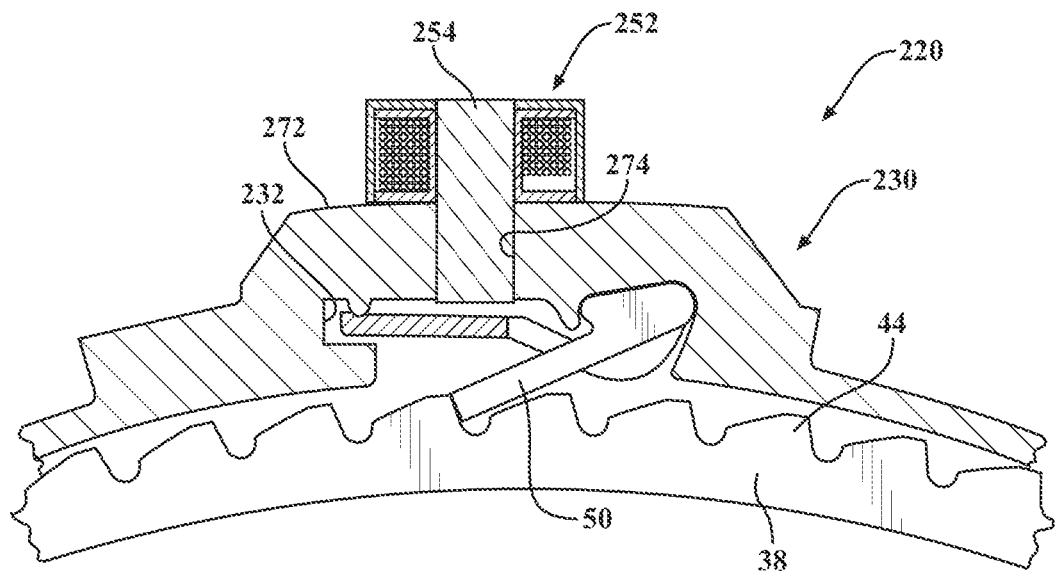
FIG. 5A is an enlarged partial cross-sectional view of FIG. 5 illustrating an orifice formed in the outer race housing configured to receive the radially pressed electromagnetic actuator in accordance with one aspect of the present disclosure.

Referring to FIGS. 5 and 5A, another example embodiment of a clutch assembly 220 is shown, wherein the same reference numerals, offset by a factor of 200, are used to again identify like components and features. In this embodiment, an orifice 274 extends directly through the outer wall 272 of the protrusion 230 to the actuator pocket 232, wherein the orifice 274 is configured to receive the core 254 of the coil assembly 252 radially therein. The core 254 of the coil assembly 252 is pressed radially inwardly into the orifice 274 and fixed therein. As a result of the core 254 being fixed in the orifice 274, the entire coil assembly 252 is fixed in place without having access to an inner portion of the protrusion 230. In the embodiment shown, the core 254 is sized for a press fit, also known as an interference fit, within the orifice 274, wherein it should be recognized that other mechanisms for fixing the core 254 in the orifice 274, other than press fit, are contemplated herein, such as discussed above with reference to adhesives, weld joints, mechanical fasteners and the like.

Figure 5B:
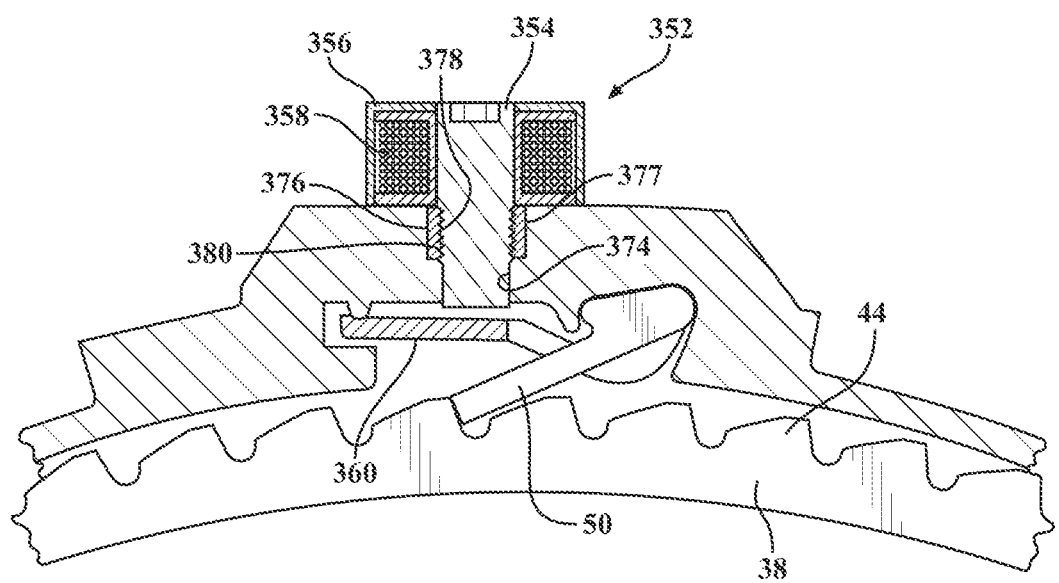
FIG. 5B is a view similar to FIG. 5A showing an electromagnetic actuator assembled to the outer race housing in accordance with another aspect of the present disclosure.

Further, as shown in FIG. 5B, another example embodiment, similar to that discussed above with regard to FIGS. 4A and 4B, is shown, wherein the same reference numerals, offset by a factor of 300, are used to identify like components and features. Rather than fixing the core 354 in direct contact with the orifice 374 in the outer wall 372, a nut 376 can be used to facilitate fixing the core 354 of the coil assembly 352 in a precise setting relative to the armature 360, thereby establishing a precise gap G therebetween, as desired, while allowing for easy adjustment. The nut 376 is provided having an outer surface 377 configured for fixation within the orifice 374, such as via at least one of press fit, bonding agent, weld joint, threaded engagement, or other suitable mechanical and/or adhesion fixation mechanism. The nut 376 further includes a threaded through passage 378 configured for threaded engagement with an externally threaded portion 380 of the core 354, shown as a portion immediately adjacent the radially outwardly extending bobbin 356 and coil 358. When threading the core 354 into engagement with the nut 376, the gap G between the free end of the core 354 and the armature 360 can be precisely set, as discussed above with regard to FIGS. 4A and 4B. Upon fixing the core 354 within the nut 376, it is to be recognized that other than the core 354, the remaining portion of the coil assembly 352 remains external to the protrusion 312, and thus, can be freely accessed when desired, such that servicing the coil assembly 352 is made easy.

Figure 6:
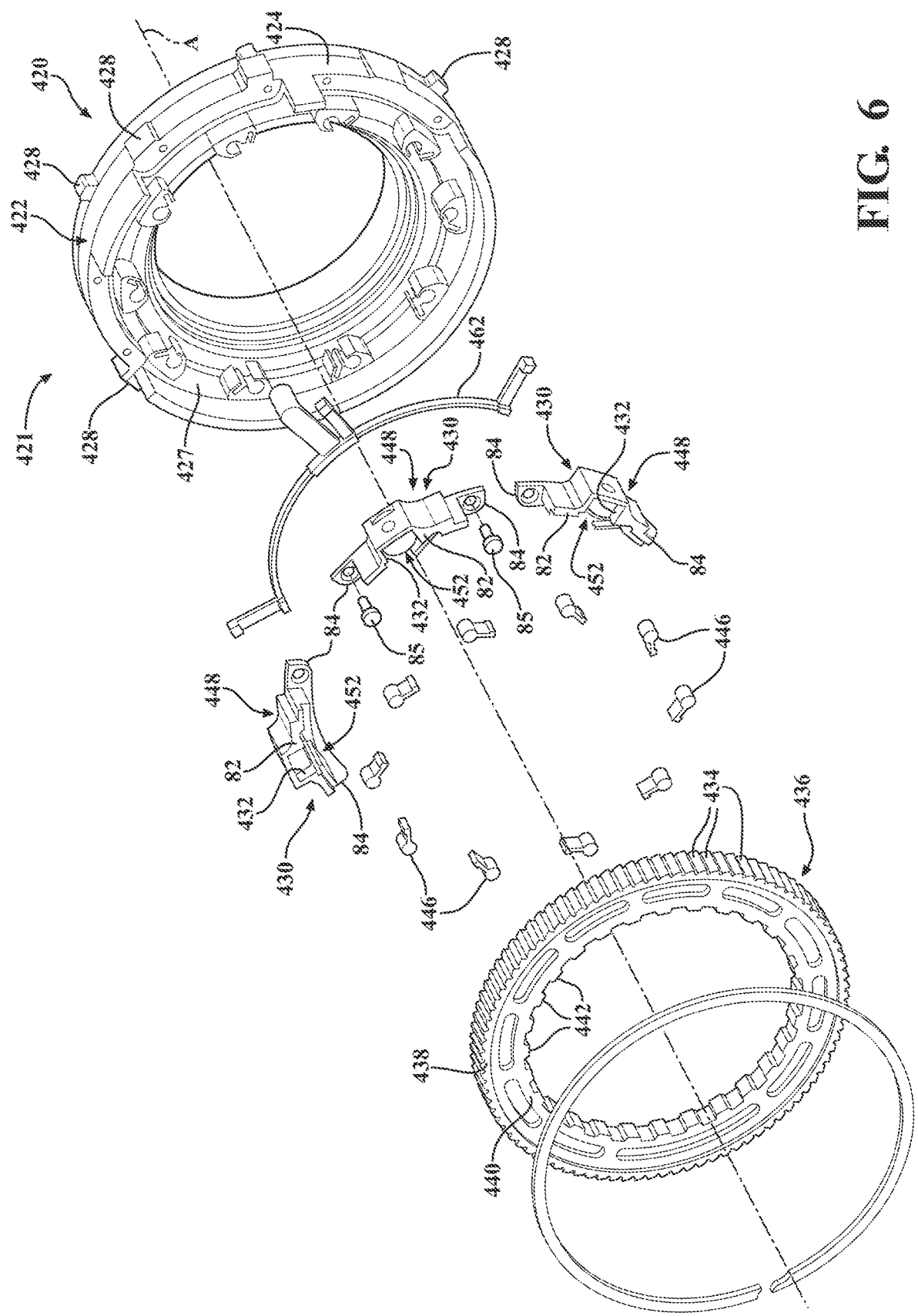
FIG. 6 is an exploded isometric view of a bi-directional clutch assembly configured to include a modular active strut arrangement for a selectable one-way clutch in accordance with another aspect of the present disclosure.
Figure 7:
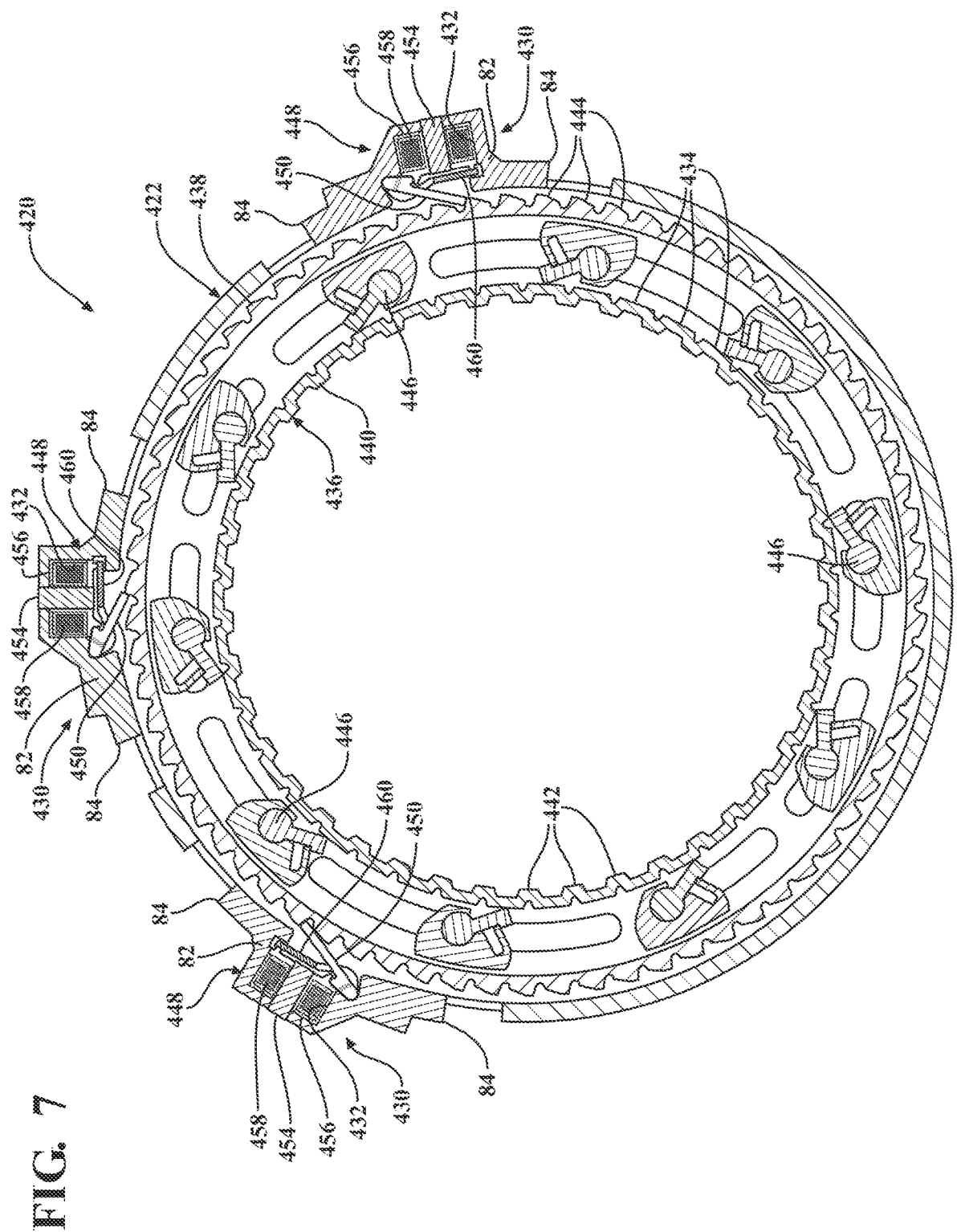
FIG. 7 is a cross-sectional side view of the bi-directional clutch assembly shown in FIG. 6.

Referring to FIGS. 6 and 7, wherein like numerals indicate corresponding parts throughout the several views, offset by a factor of 400, another embodiment of a clutch assembly 420 is generally shown. The clutch assembly 420 includes an outer race 422 that extends annularly about an axis A. The outer race 422 includes an outer ring 424 that presents a plurality of outer lugs 428 that extend radially outwardly for mating with a first component. The first component can be a stationary component (such as a housing of a transmission) or a rotary component (such as a shaft). The outer race 422 further has an axially facing web or face 427 that has an annular shape that extends radially inwardly from the outer ring 424. A plurality of passive struts 446 are pivotally connected to the axial face 427. A biasing spring (not shown) engages each of the passive struts 446 for biasing the passive struts 446 in a locked position toward an inner race 436.

The inner race 436 extends annularly about the axis A. The inner race 436 has an outside rim or band 438 and an inside rim or band 440 that are spaced radially from one another on opposing sides of the passive struts 446. The outside band 438 is connected of the inside band by a radially extending band, that extends radially outward from the inside band 440 and radially inward from the outside band 438. The inside band 440 of the inner race 436 presents a plurality of inner lugs 442 that extend radially inwardly therefrom for mating with a second component (typically a rotary component). The inner band 440 of the inner race 436 also presents a plurality of passive teeth 434 that extend radially outwardly therefrom for being engaged by the passive struts 446 (coupled to the outer race 422) for locking the inner and outer races 436, 422 to one another in response to counter-clockwise rotation of the inner race 436 relative to the outer race 422. The outside band 438 of the inner race 436 presents a plurality of active teeth 444 that extend radially outwardly therefrom and are evenly distributed about the axis A, and are configured to engage with active strut assemblies 448 coupled to the outer race 422, as further described below.

A plurality of active strut assemblies 448 are axially connected to the outer race 422. Each of the active strut assemblies 448 includes a generally arc shaped protrusion 430, wherein the protrusion 430 may be constructed as a separate piece of material from the outer race 422. Each protrusion 430 includes a base 82 and a pair of circumferentially extending flanges 84 that extend from the base 82 on opposing sides of the base 82. A fastener 85, e.g., a bolt, extends axially through a through opening in each of the flanges 84 and is fastened to the outer race 422 for securing the active strut assemblies 448 to the outer race 422. The active strut assemblies 448 are arranged in circumferential alignment with one another about the axis A, as desired. As shown in FIG. 7, three active strut assemblies 448 are disposed on the outer race 422, spaced apart circumferentially on the same radial side of the outer race 422 It will be appreciated that the number of active strut assemblies 448 and spacing may vary, with corresponding structural modifications made to the outer race 422 to accommodate. However, it may be preferable for the active strut assemblies 448 to bunched together on the same side of the outer race 422 for electrical connectivity purposes, for example.

An actuator pocket 432 extends axially into the base 82 of each of the active strut assemblies 448. A coil assembly 452 is disposed in each of the actuator pockets 432. The coil assembly 452 includes a core 454 of a magnetically permeable material, a bobbin 456 configured for receipt about the core 454, and a coil 458 wrapped about the bobbin 456. It should be appreciated that the bobbins 456 and coils 458 of the coil assemblies 452 can advantageously be easily fitted into their respective pockets 432 for easy installation. The above described variations for installing and securing the active strut assemblies of previously disclosed embodiments may also be used for the active strut assemblies 448.

Each of the active strut assemblies 448 includes an active strut 450 that is selectively pivotal between a locked and an unlocked position, as discussed above, in response to a magnetic flux. In the locked position, the active struts 450 engage the active teeth 444 of the inner race 436, therefore locking the outer and inner races 422, 436 to one another during clockwise movement of the inner race 436 relative to the outer race 422. However, the active struts 450 allow relative displacement, i.e., overrun, in the counter-clockwise direction. In the unlocked position, the active struts 450 are radially spaced from the active teeth 444, allowing the outer and inner races 422, 436 to rotate relative to one another in both directions.

The plurality of passive struts 446 are pivotal between a locking position and an unlocking position. In the locking position, the passive struts 446 (held by the outer race 422) engage the passive teeth 434 of the inner race 436 for connecting the outer and inner races 422, 436 to one another during counter-clockwise rotation of the inner race 436 relative to the outer race 422. Therefore, engagement by the passive struts 446 prevents relative displacement of the outer and inner races 422, 436 in the counter-clockwise direction, however, the passive struts 446 allow relative displacement, i.e., overrun, in the clockwise direction. In the unlocking position, the passive struts 446 are radially spaced from the passive teeth 434 of the inner race 436, thereby allowing counter-clockwise rotation of the inner race 436 relative to the outer race 422.

Each of the active strut assemblies 448 further includes an armature 460 disposed between the active strut 450 and the core 454 for providing the pivotal movement of the active strut 450 in response to energization of the coil 458. The armature 460 is pivotably attached to the active strut 450, and pivoting of the armature 460 in response to energization of the coil 458 will cause the active strut 450 to pivot to the locked position, as shown in FIG. 7. The active strut 450 may be biased toward the unlocked position, such that non-energization of the coil 458 causes the active strut to move to the unlocked position, and the armature to move away from the coil 458. A lead frame 462, such as discussed above with regard to FIGS. 1 and 2, electrically connects the coils 458 to one another for energizing the coils 458 to actuate and pivot the active struts 450 to their engaged, locked positions.

Accordingly, it should be appreciated that the modular configuration of the active strut assemblies/coil assemblies 448, 452 allows the active strut assemblies/coil assemblies 448, 452 to be manufactured separately from the rest of the clutch assembly 420. Further, it should be appreciated that any number of the active strut assemblies/coil assemblies 448, 452 could be installed on any given clutch assembly 420 as needed to provide a needed amount of torque. Additionally, it should be appreciated that the modular active strut assemblies as described herein could be utilized on various other clutch assembly configurations.

It should be appreciated that being able to axially or radially load the coil assemblies 52, 152, 252, 352, 452 discussed above provides for a simple manufacturing assembly step and allows the coil assembly 52, 152, 252, 352, 452 to be assembled before being installed into the respective actuator pocket 32, 132, 232, 332, 432. It should further be appreciated that the aforementioned axially and radially loading pockets/protrusions could be utilized on other clutch assembly configurations.

Figure 8:
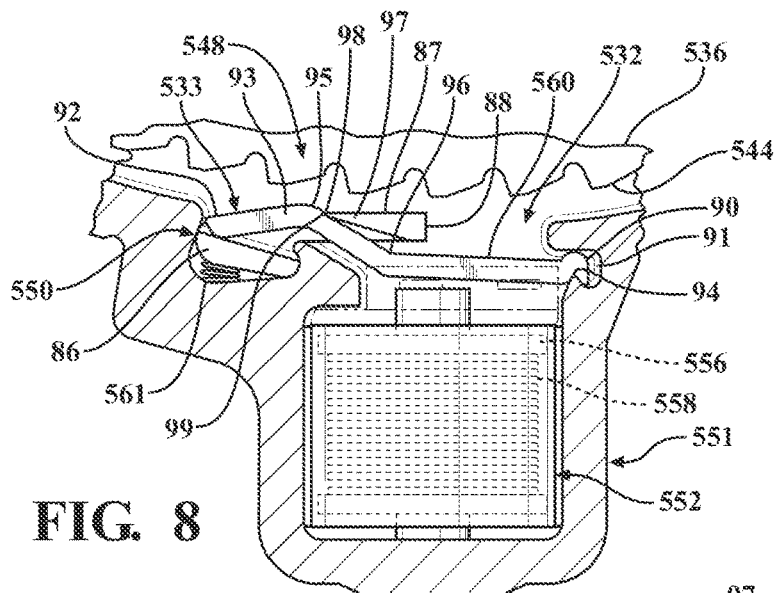
FIG. 8 is an enlarged partial side view of an active strut assembly adopted for use with the selectable one-way clutch associated with the bi-directional clutch assemblies of FIG. 1 and configured to provide a high inertia load resistance arrangement in accordance with the present disclosure and illustrating the active strut in an unlocked position when an electromagnetic actuator is non-energized.
Figure 9:
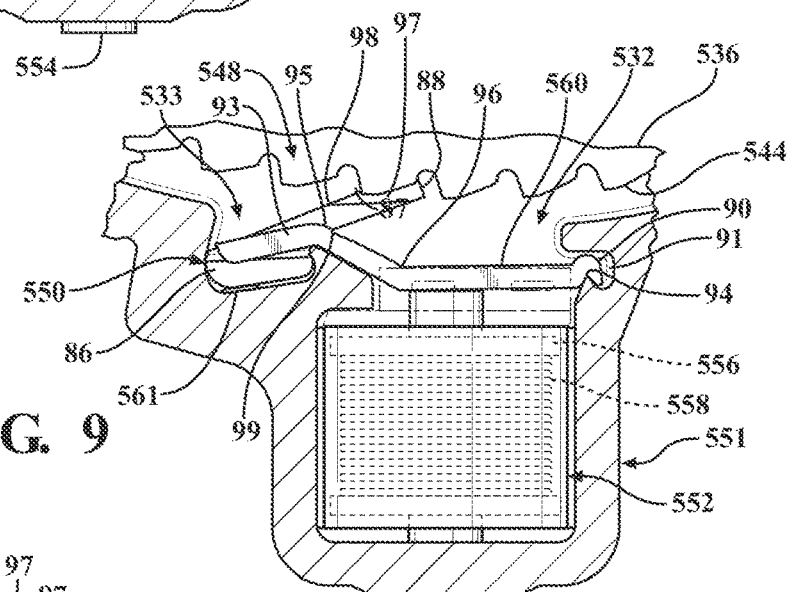
FIG. 9 is similar to FIG. 8 illustrating the active strut located in a locked position in response to energization of the electromagnetic actuator.
Figure 10:
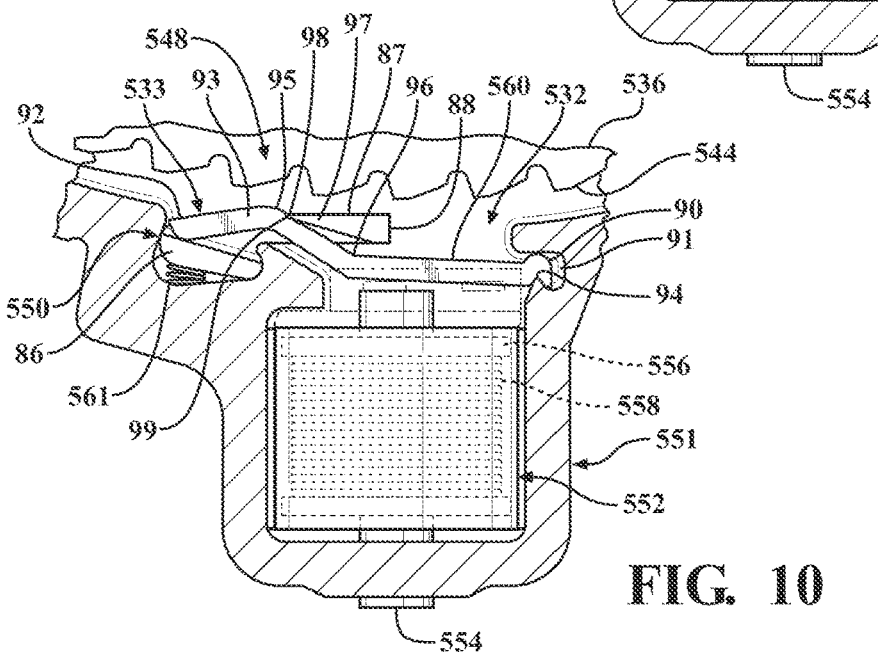
FIG. 10 is similar to FIG. 8 illustrating the inertia load resistance arrangement positively holding the active strut in its unlocked position upon application of a radially directed high inertial load.

Referring to FIGS. 8-10, wherein like numerals indicate corresponding parts throughout the several views, offset by a factor of 500, an active strut assembly 548, which can be incorporated in any of the bi-directional clutch assembly embodiments discussed herein, as well as others, as will be readily apparent to one skilled in the art, is received in a strut pocket 533 of the outer race 522. Each of the active strut assemblies 548 is operable via actuation of an electromagnetic actuator 551 having a coil assembly 552, an armature 560, a biasing spring 561, and an active strut 550.

The active strut 550 includes a base segment 86 and a locking arm 87. The locking arm 87 extends from the base segment 86 to a locking end or edge 88. The base segment 86 is pivotally disposed in the strut pocket 533 for pivoting movement between a locked position (FIG. 9) and an unlocked position (FIGS. 8 and 10). In the locked position, the locking edge 88 engages the outer ratchet teeth 544 of the inner race 536, and in the unlocked position, the locking edges 88 are radially spaced from the outer ratchet teeth 544 of the inner race 536. The biasing spring 561 is disposed in the strut pocket 533 and extends between the base segment 86 and a base or floor of the strut pocket 533 for biasing the strut 550 toward the unlocked position.

The coil assembly 552 includes a core 554 of a magnetically permeable material that is disposed through a central passage of a bobbin 556, with at least one coil 558 being wrapped directly onto the bobbin 556, and thus, operably about the core 554 for focusing the magnetic flux produced by the coil 558 about the core 554.

The armature 560 extends between a first end 90 that is seated in an armature section 91 of the actuator pocket 532 for pivotal movement therein and a second end 92 that extends into the strut pocket 533 into engagement with the base 86 of the strut 550. The armature 560 is shown as having bifurcated legs 93 forming a channel therebetween, wherein the channel is sized for clearance receipt of a reduced width section of the strut 550 therein, with each leg 93 extends along opposite sides of the strut 550. The first end 90 of the armature 560 is pivotally disposed about a pivot rail 94 in the armature section 91 of the pocket 532 for pivoting radially toward and away from the core 554, in response to energization of the coil 558, between an actuated position and a non-actuated position. In the actuated position, the armature 560 is drawn toward the core 554, whereupon the legs 93 drive the strut 550 into the locked position via engagement with the base segment 86. In the non-actuated position, the armature 560 is spaced from the core 554 and allows the biasing spring 561 to bias the strut 550 into the unlocked position. The armature 560 presents an upper bend 95 in each leg 92 and a lower bend 96 adjacent an attachment region of the legs 92, such that the upper and lower bends 95, 96 are between the first end 90 and the second end 92.

It is important, especially when the clutch assembly 520 is utilized on automotive components, for the struts 550 to only engage the outer ratchet teeth 544 of the inner race 536 when then coil assembly 552 is energized to intentionally move the struts 550 to the locked position. Therefore, resistance to inertia loading (high g-force in certain directions other than simple gravity) is important for the operation of the clutch assembly 520. The most common method of resisting high inertia loading is to utilize a higher force biasing spring 561. While this method is a quick fix, there are disadvantages associated therewith. One of the disadvantages is the increased resistance provided by the biasing spring 561 during normal operation, which requires the armature 560 and/or coil assembly 552 to be increased in size and thickness to produce the necessary increased magnetic forces to overcome the increase in spring force imparted by the larger spring 561. To accommodate such larger components, the pockets 532, 533 may also need to be larger, thereby increasing the overall size and weight of the clutch assembly 520.

As an alternative solution to increasing the size of the aforementioned components/assemblies, the generally central portion of the strut 550 that extends between the legs 93 of the armature 560 includes a projections 97 that have a generally triangular shaped cross-section that extends lengthwise along a portion of the locking arm 87, with the projections 97 extending outwardly from the central portion of the locking arm 87 away from one another into overlying relation with a respective leg 93. Each of the projections 97 converges and terminates at a generally sharp edge 98. Further, a shoulder 99 is defined by or provided adjacent the upper bend 95 in the legs 92 of the armature 560. The shoulders 99 are configured to be engaged by the edges 98 of the projections 97 of the strut 550 for restricting the strut 550 against movement toward the locked direction, unless otherwise actuated via energization of the coil assembly 552. Thus, during the application of inertial forces, the purposeful engagement of the projections 97 with the shoulders 99 causes the strut 550 to stop rotating upwardly, thereby preventing engagement of the outer ratchet teeth 544 of the inner race 536 with the locking edge 88 of the strut 550 (as best shown in FIG. 10).

FIG. 8 presents a non-energized position of the coil 558, with the strut 550 in the unlocked position. Further, FIG. 9 presents an energized position of the coil 558, causing the strut 550 to be pivoted to the locked position, as intended. FIG. 10 shows the situation in which a high inertial load is applied to the clutch assembly 520 in the radial inward direction. In this situation the armature 560 rotates clockwise slightly under the inertial load, however, the strut 550 is blocked and prevented from rotating counter-clockwise any further due to the intentional interference established between the abutting shoulder 99 of the armature 560 and the locking edges 98 of the projections 97. Therefore, the interference between the edges 88 of the projections 97 and the shoulders 99 of the armature 560 greatly increase the force required to move the strut 550 against the outer ratchet teeth 544 of the inner race 536, but doesn't increase the amount of load required by the armature 560/coil assembly 552 to pivot the strut 550, as commanded and intended.

It should be appreciated that the projections 97 of the struts 550 and shoulders 99 of the armature 560 could be utilized on other active strut assembly configurations to resist high inertia loading.

Each of the bi-directional clutch assemblies disclosed in reference to FIGS. 1-10 are generally configured to include a stationary outer race and a rotary inner race with the passive and active struts arranged to establish a locked (i.e. "braked") connection therebetween. Obviously, these bi-directional clutch assemblies could also be configured for use with rotary inner and outer races to establish "rotary" connections therebetween as well. In this regard, the present disclosure also contemplates alternative configurations of a bi-directional clutch assembly comprising: a rotary outer race; a rotary inner race; a passive one-way clutch operable to normally establish a reasonable torque-transferring connection between the inner and outer races; and a selectable one-way clutch selectively actuated by an electromagnetic actuator to establish other torque-transferring connections between the inner and outer races. Particular applications of this type of bi-directional clutch assembly may include, without limitations, axle disconnect clutches in 4WD/AWD drivelines as well as motor disconnect clutches in electric transaxles and electric drive axles. Accordingly, the following embodiment(s) illustrated in FIGS. 11-23 are directed to this type of electric disconnect (E-Disconnect) clutch assembly and provide enhancements with respect to traditional dog-type positive engagement clutches now used in conventional arrangements.

By way of background, there is a recognized need in hybrid vehicle applications to employ a mechanical coupling device to selectively connect and disconnect an electric motor with respect to a geartrain within an E-drive assembly (i.e. electric transaxle, electric drive axle, etc.). The mechanical coupling devices must be operable to selectively couple the rotary output of the electric motor to the geartrain (or other portions of the driveline) when needed to establish an electric drive mode, and to uncouple the rotary output of the electric motor when the electric drive mode is no longer required in order to prevent unnecessary drag. As noted above, conventionally a positive-engagement dog-type clutch is used in this vehicular application to establish the coupled/uncoupled (i.e. ON/OFF) operative states, typically via movement of a sliding lock sleeve. Unfortunately, such dog clutches require high backlash angles, require high release forces to disengage, and do not allow a ratcheting-type behavior (i.e. "freewheeling" in one direction) such as in the event of an overspeed condition when the geartrain rotates faster than the electric motor shaft.

Figure 11:
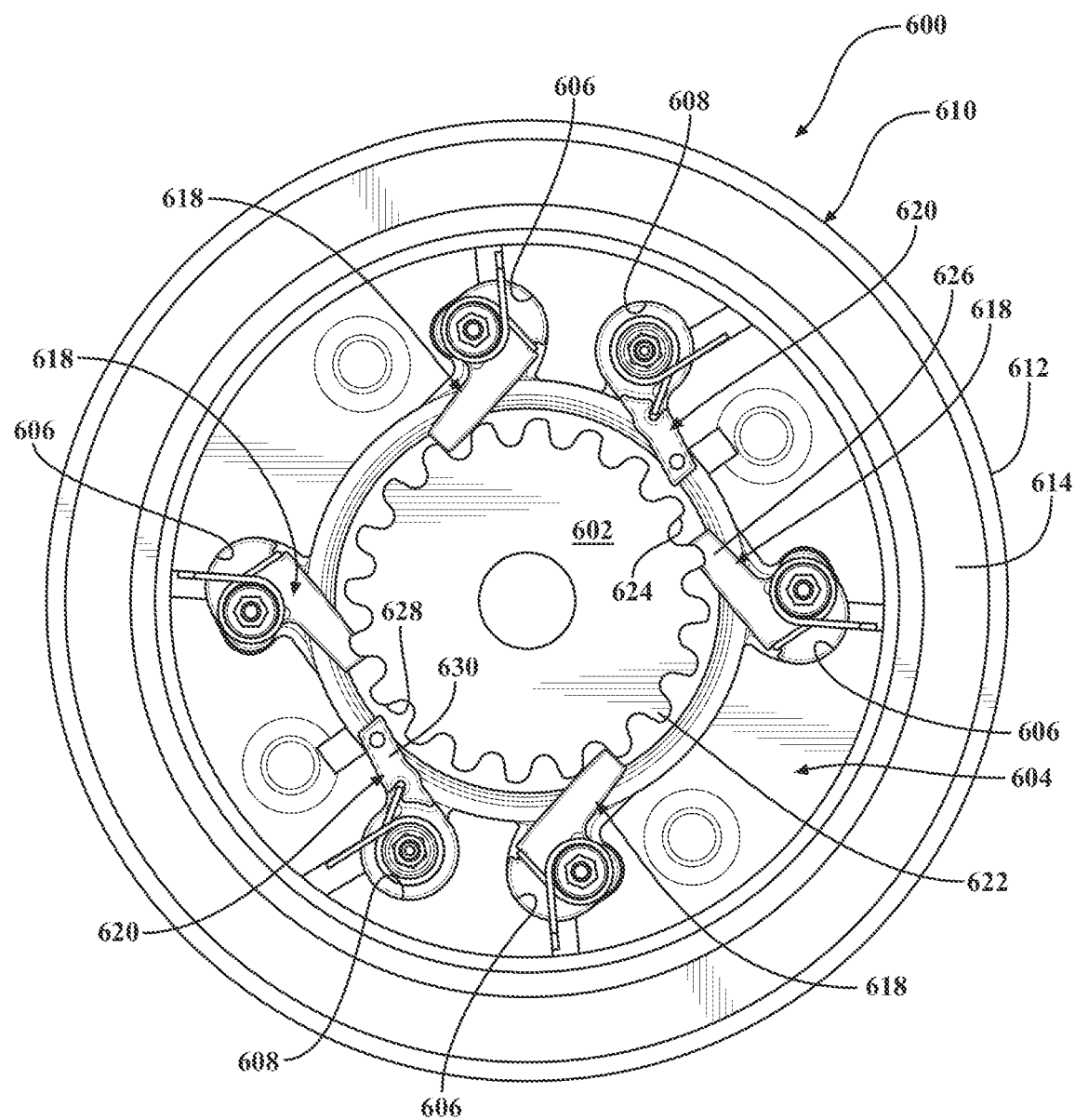
FIG. 11 is a sectional view of yet another embodiment of a bi-directional clutch assembly constructed in accordance with another aspect of the present disclosure.

To address these and other shortcomings, the present disclosure provides a bi-directional clutch assembly 600, shown in FIGS. 11-23. In general, bi-directional clutch assembly 600 includes a rotary inner race 602, a rotary outer race 604 defining sets of passive strut pockets 606 and a set of active strut pockets 608, a coil assembly 610 having a stationary (non-rotating) bobbin 612 supporting an annular coil unit 614 and an armature ring 616 which is fixed for rotation with outer race 604 and yet is axially moveable relative to coil unit 614, a set of passive strut assemblies 618 each having a passive strut 626 pivotably supported in a corresponding passive strut pocket 606, and a set of active strut assemblies 620 each having an active strut 630 pivotably supported in a corresponding active strut pocket 608. As shown in FIG. 11, the coil assembly 610 is disposed radially outward from the outer race 604, which is disposed radially outward from the inner race 602. Put another way, the outer race 604 is disposed radially between the coil assembly 610 and the inner race 602.

FIG. 11 illustrates a non-limiting embodiment of bi-directional clutch assembly 600 with armature ring 616 removed for clarity. Armature ring 616 may be seen at least in FIGS. 14-18. Inner race 602 has an outer surface defining ratchet teeth 622 each having a first strut engagement surface 624 configured to locking engage an engagement portion of passive struts 626, and a second strut engagement surface 628 configured to selectively locking engage an engagement portion of active struts 630. Inner race 602 can be a separate component or integrated into a rotary component, such as a shaft, as will be shown later. The first and second strut engagement surfaces 624 and 628 may be disposed on opposite sides of the teeth 622 to block or limit rotation in opposite directions depending on the position of the passive struts 626 or active struts 630. The passive struts 626 and/or active struts 630 may project into the path of the teeth 622 as the inner race 602 rotates relative to the outer race 604 to block rotation in one direction, while allowing rotation in the opposite direction. However, it will be appreciated that when both passive and active struts 626 and 630 project into the path of the teeth 622, rotation may be blocked in both directions, even if the struts 626 and/or 630 would otherwise allow rotation in one rotational direction.

Figure 12:
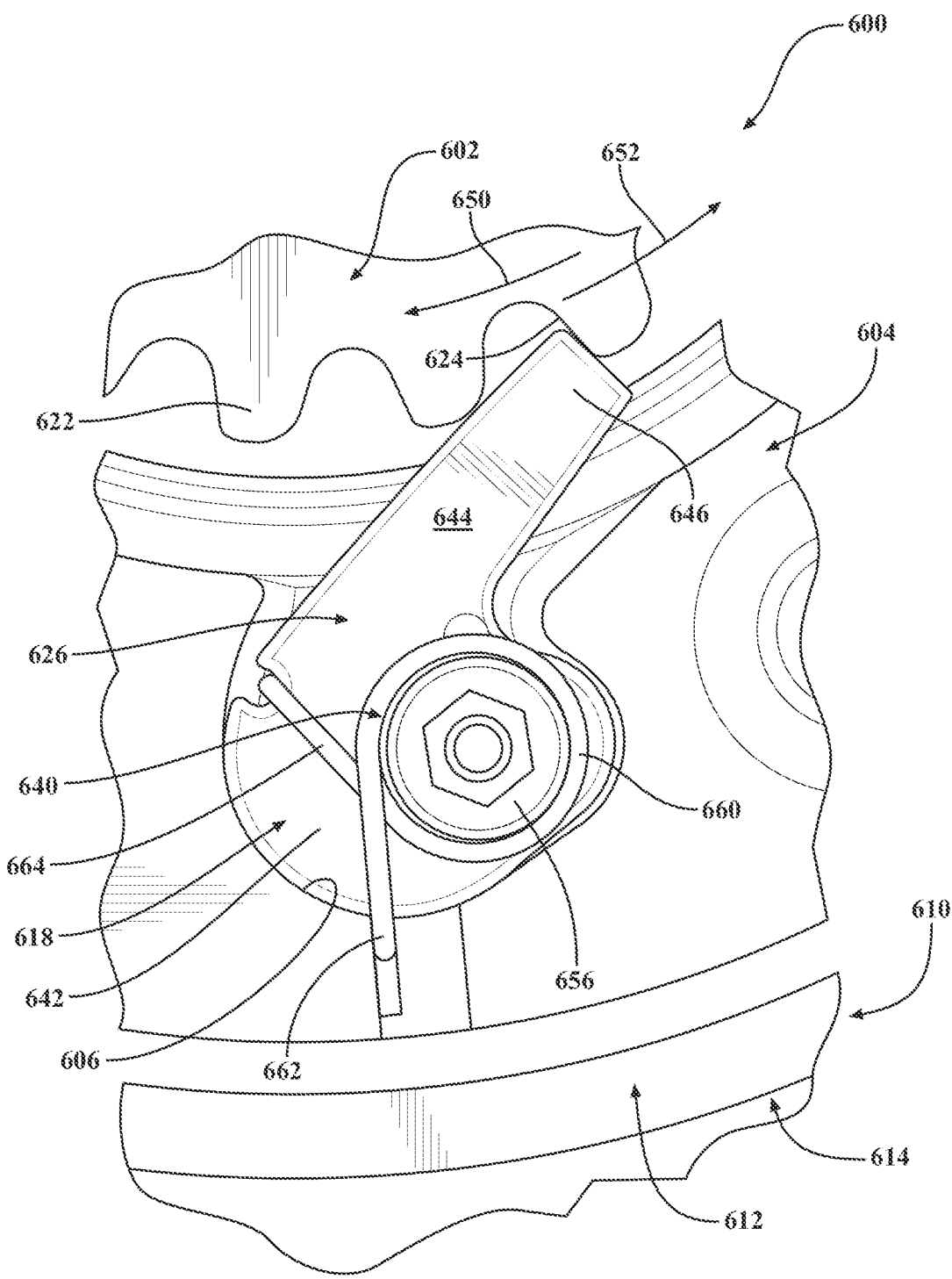
FIG. 12 is an enlarged partial view taken from FIG. 11 and illustrating the configuration of one of the passive strut assemblies in greater detail.

FIG. 12 illustrates one of passive strut assemblies 618 which generally includes passive strut 626 and a torsional biasing spring 640. Passive strut 626 includes a body segment 642 pivotably supported in passive strut pocket 606, and a leg segment 644 having an engagement tip 646 configured to selectively engage first strut engagement surface 624 of ratchet teeth 622. The passive strut pocket 606 is operable to allow rotation or pivoting of the body segment 642 relative to the outer race 604. The passive strut pocket 606 may be formed in the outer race 604.

As is understood, passive strut 626 operates to normally establish a "coupled" state between inner rate 602 and outer race 604 in a first rotary direction (arrow 650) and a ratcheting or "freewheeling" state in a second rotary direction (arrow 652). Referring back to FIG. 11, the passive one-way clutch is configured to provide a "dual" passive strut engagement arrangement. Specifically, two pairs of diametrically opposed passive strut assemblies 618 are provided, with one pair shown engaged and the other pair shown ready to engage. As shown in FIG. 11, the pair of assemblies 618 that are engaged are illustrated at the top and the bottom of the figure, with the pair that are shown ready to engage being disposed at the left and the right of the figure. This arrangement reduces the required backlash angle of ratchet teeth 622. Passive struts 626 are meant to effectively always be engaged with ratchet teeth 622 in some respect. If the speed differential between inner race 602 and outer race 604 works in the engagement direction (arrow 650), then the passive one-way clutch is engaged and transfers torque. In contrast, if the speed of outer race 604 exceeds that of inner race 602 (arrow 652), the passive one-way clutch is released and passive struts 626 will ratchet over teeth 622. When the speed of the outer race 604 reduces from this speed at which ratcheting occurs, the backlash is reduced due to the dual pairs of assemblies that are engaged at slightly different rotational positions.

In one aspect, as shown in FIG. 11, the passive strut assemblies 618 are evenly distributed about the outer race 604. However, in another aspect, the passive strut assemblies 618 may be unevenly distributed. The pairs of passive strut assemblies 618 may also be disposed in a non-diametrically opposed manner. As shown, four passive strut assemblies 618 are illustrated, however additional assemblies 618 may be used. In one aspect, three passive strut assemblies 618 may be arranged to be engaged with another three arranged to be ready to be engage, with the sets of three evenly distributed about the outer race 604. In another aspect, three pairs may be used, where one pair is engaged and the other two pairs are ready to be engaged. It will be appreciated that various other arrangements in number and spacing may also be used.

Referring again to FIG. 12, passive struts 626 are configured to be "tail-heavy", which means that due to the rotational speed, leg segment 644 of passive struts 626 moves outward in a pivoting motion relative to passive strut pocket 606 toward its deployed/locked position shown. This tail-heavy configuration is provided by locating a spring pin 656 on body segment 642 in an offset orientation relative to the pivot axis of passive strut 626. Torsion spring 640 has a looped portion 660 surrounding spring pin 656, a first leg portion 662 engaging outer race 604, and a second leg portion 664 engaging body segment 642 of passive strut 626. Leg portions 662 and 664 of spring 640 act along the same plane to avoid "tipping" of passive strut 626. This "non-centric" configuration results in passive struts 626 being naturally biased to move toward its deployed/locked position.

Turning now to the active struts 630, FIG. 11 shows a pair of diametrically-opposed active strut assemblies 620 pivotally mounted in active strut pockets 608 of outer race 604 and aligned in an opposite actuation orientation with respect to passive strut assemblies 618. Put another way, the active strut assemblies 620 block relative rotation in the opposite rotational direction with respect to the passive strut assemblies 618. As shown, each of the active strut assemblies 620 are disposed between two of the passive strut assemblies 618. The number and positioning of active strut assemblies 620 is merely a design choice and not intended to limit the disclosure.

Figure 13:
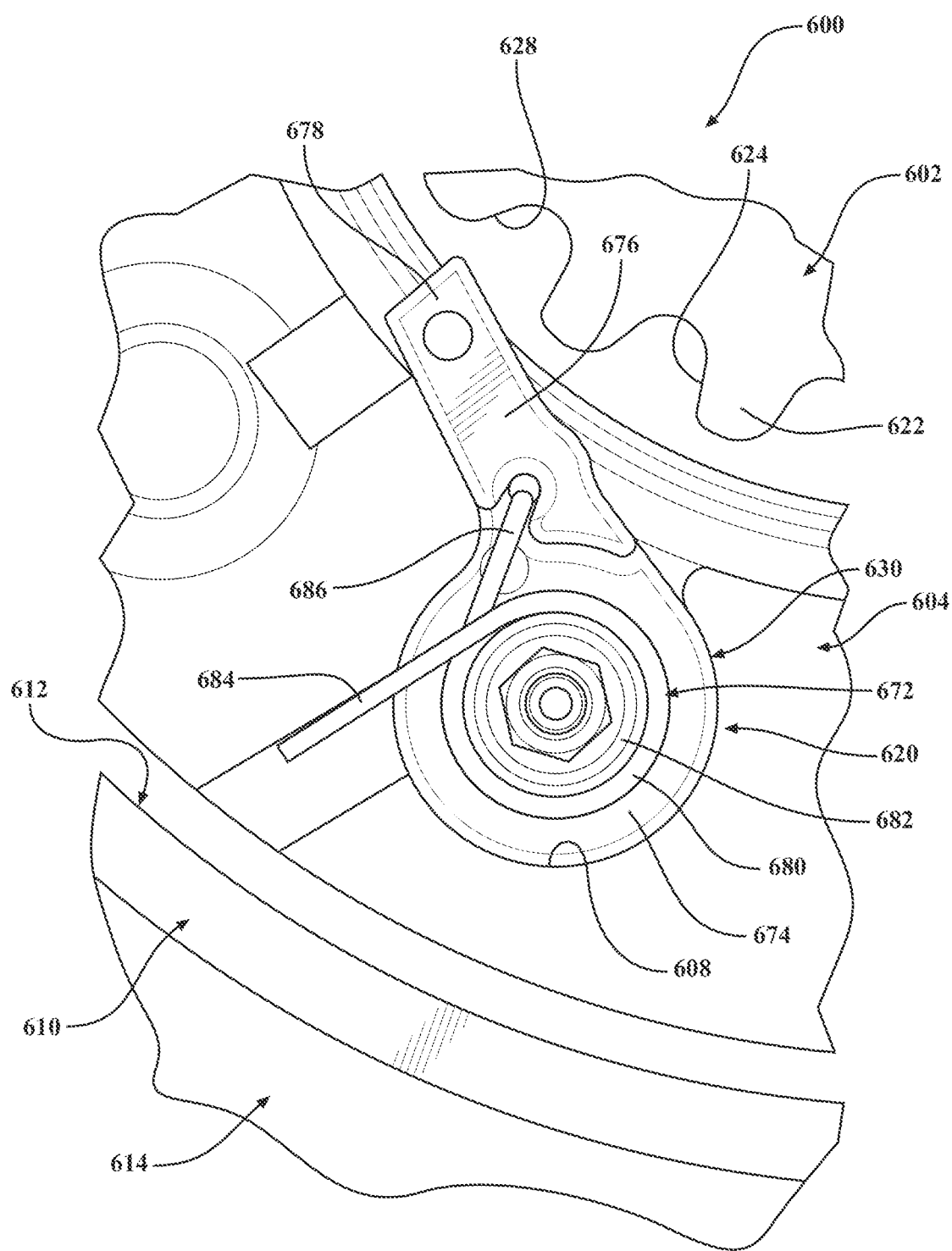
FIG. 13 is another enlarged partial view taken from FIG. 11 and illustrating the configuration of one of the active strut assemblies in greater detail.

FIG. 13 is an enlarged partial view of clutch assembly 600 to better illustrate the structure and operation of active strut assemblies 620 which are shown to generally include active strut 630 and a torsional biasing spring 672. Active strut 630 is a "tip-heavy" configuration having a body segment 674 supported in active strut pocket 608, and an actuation leg segment 676 having an end tip portion 678 configured to lockingly engage second strut engagement surface 628 of ratchet teeth 622. Torsion spring 672 includes a loop section 680 surrounding a "centric" spring post 682 formed on active strut 630, a first leg section 684 engaging outer race 604, and a second leg section 686 having a bent end retained in a spring bore formed in leg segment 676 of active strut 630. As outer race 604 rotates, tip portion 678 is centrifugally biased in a direction away from engagement with ratchet teeth 622 so as to naturally bias active strut 630 toward its non-deployed position (shown). Spring 672 is provided to assist in biasing strut 630 toward its non-deployed position and further assists in releasing active strut 630 from engagement with second strut engagement surface 628 of ratchet teeth 622.

Thus, the passive strut assemblies 618 are biased into the deployed position and the active strut assemblies 620 are biased into the non-deployed position, both by the centrifugal force of the rotation of the outer race 604 as well as the spring-loading on the assemblies 618, 620. Passive strut assemblies 618 are not typically disposed in a non-deployed position, because their movement occurs passively based on rotational directions and ratcheting. Active strut assemblies 620 may be actuated into the deployed position against the bias.

Active struts 630 work in cooperation with always-engaged passive struts 626. When deployed (via energization of coil unit 614), active struts 630 function to lock inner race 602 to outer race 604 in both directions, ensuring the second, active mode for bi-directional clutch assembly 600, that is the Lock-Lock mode. The primary reason that only one pair of active struts 630 is used compared to two pair of passive struts 626 is that passive struts 626 engage first and then active struts 630 subsequently engage to provide the Lock-Lock mode. Active struts 630 never engage first, and consequently, they never have to meet strict backlash requirements for tooth engagement. Obviously, further combinations of this orientation/relationship can be used for higher torque capacity applications. For example, additional active strut assemblies 620 may be included; however, in one aspect, such additional active strut assemblies 620 would preferably be arranged such that they are engaged with the teeth 622 at the same time as the other active strut assemblies 622, because the backlash requirement does not apply, so offset rotational positioning may not provide a benefit.

Figure 14:
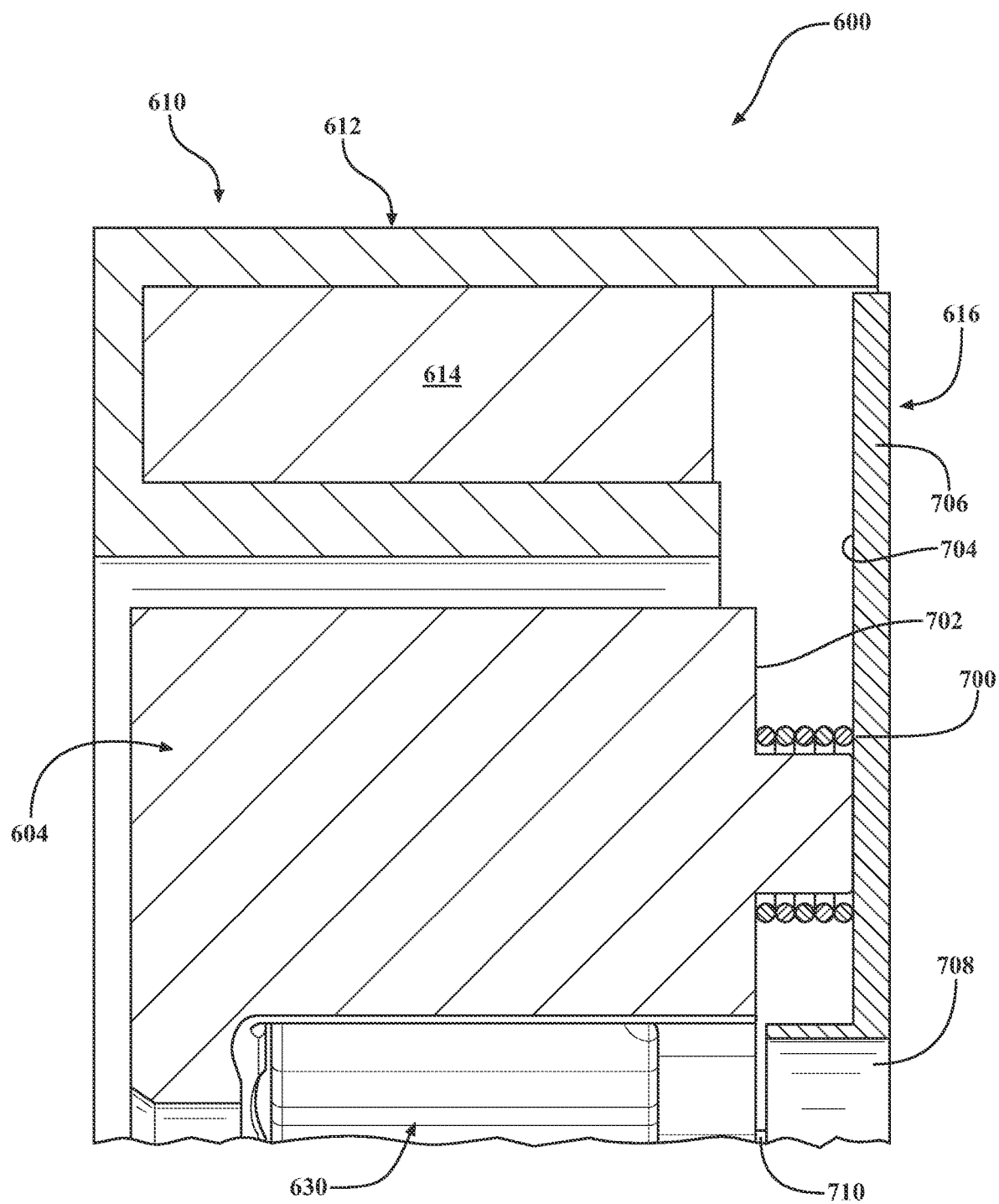
FIG. 14 is a sectional view of the bi-directional clutch assembly of FIG. 11 which better illustrates many of the components associated with the active strut assembly.
Figure 15:
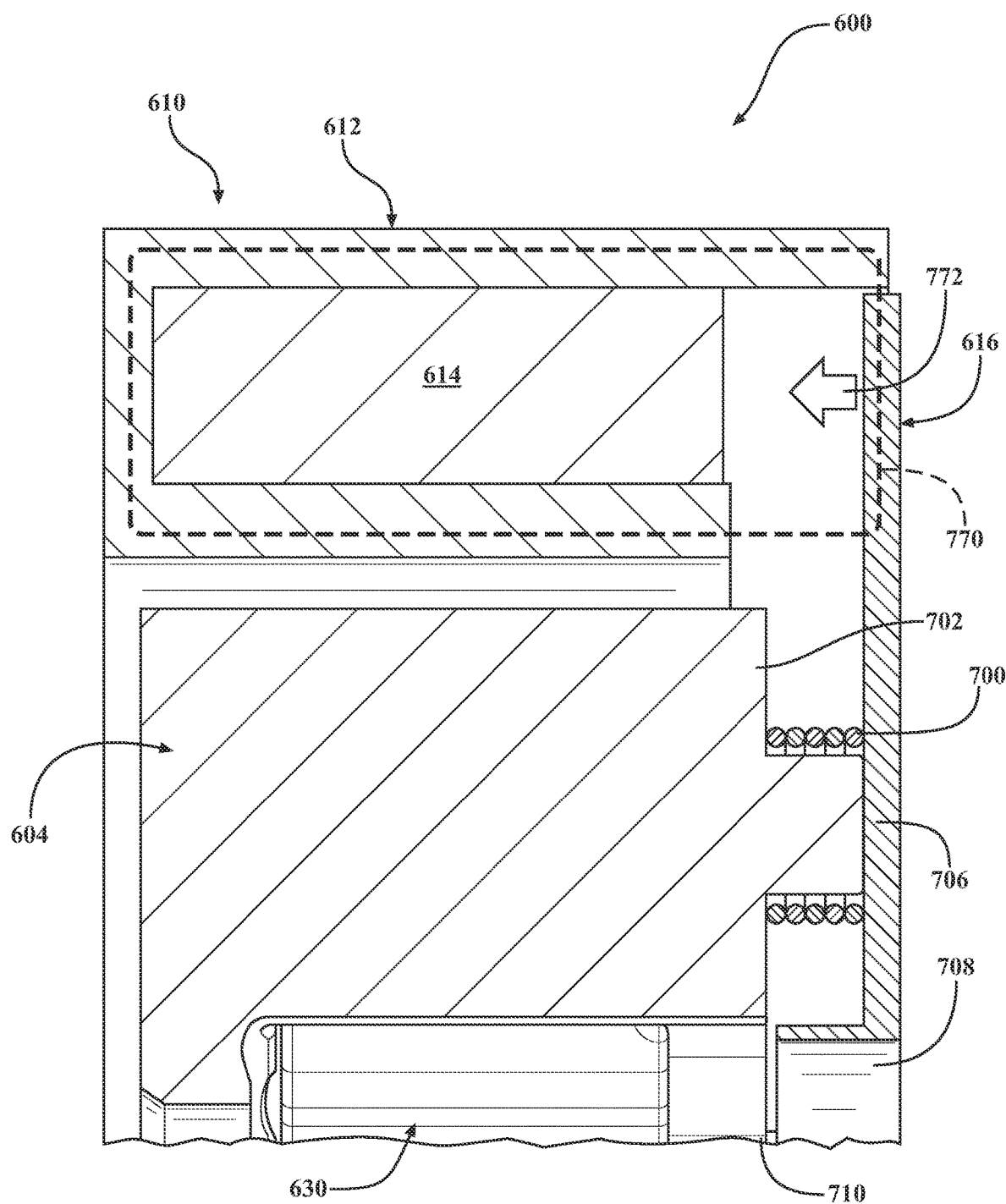
FIG. 15 is similar to FIG. 14 and now illustrates a magnetic flux path generated in response to energization of a coil unit and corresponding axial movement of an armature ring relative to the active strut assembly resulting from the magnetic flux path.
Figure 16:
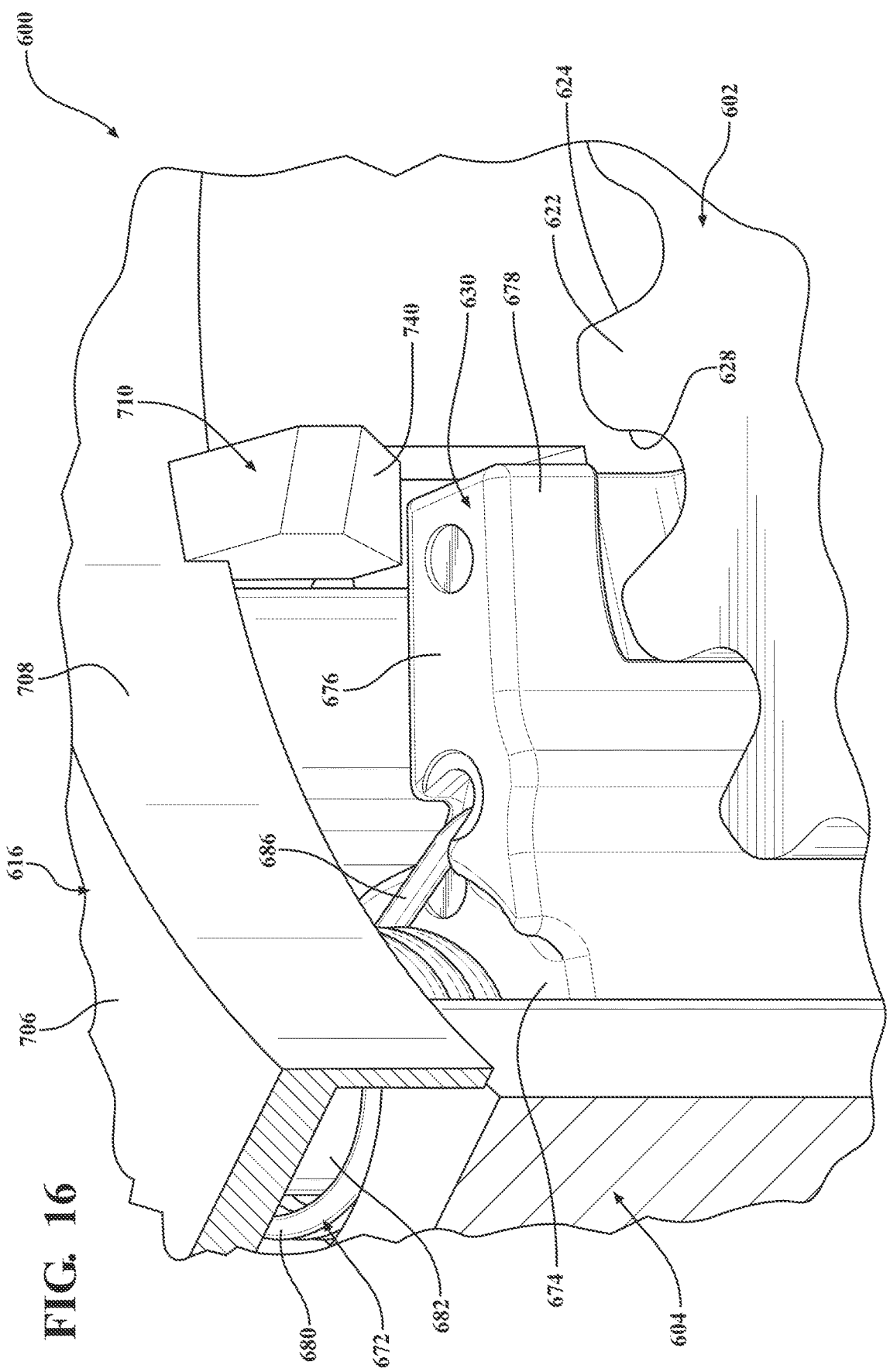
FIG. 16 is a partial isometric view showing the armature ring located in a non-actuated position with its strut engagement feature displaced from engagement with the active strut assembly, whereby the active strut assembly is maintained in its non-deployed position when the coil unit is in a non-energized state.

Referring now to FIGS. 14-16, armature ring 616 is shown in a non-actuated position relative to coil unit 614 and active struts 630. Armature ring 616 is normally biased toward its non-actuated position via a return spring 700 acting between an outer face surface 702 of outer race 604 and an inner face surface 704 of armature ring 616. With reference to FIG. 14 the armature ring 616 is biased to the right, in an axial direction. The return spring 700 is disposed axially between the outer face surface 702 and the inner face surface 704. Armature ring 616 is a magnetic component having a ring segment 706 (shown in cross-section in FIG. 14) overlying coil unit 614, and a lip flange segment 708 from which a pair of strut actuation features, shown as lugs 710 extend. The lip flange segment 708 is partially shown in FIG. 14, and extends axially to the left in a generally perpendicular relationship with the ring segment 706. Each strut actuation lug 710 on armature ring 616 is aligned with a corresponding leg segment 676 on active struts 630 (see FIG. 16). As noted previously, armature ring 616 is fixed for common rotation with outer race 604 but is axially moveable relative thereto between its non-actuated position and an actuated position.

FIG. 15 schematically illustrates that energization of coil unit 614 functions to generate a magnetic flux circuit or path 770 that is operable for magnetically attracting armature ring 616 toward coil unit 614 for causing movement thereof from its non-actuated position toward its actuated position, as is indicated by arrow 772. Such movement of the armature ring 616 shifts the ring segment 706 and the flange segment 708 to the left, thereby shifting lug 710 to the left toward the active strut 630.

Figure 17:
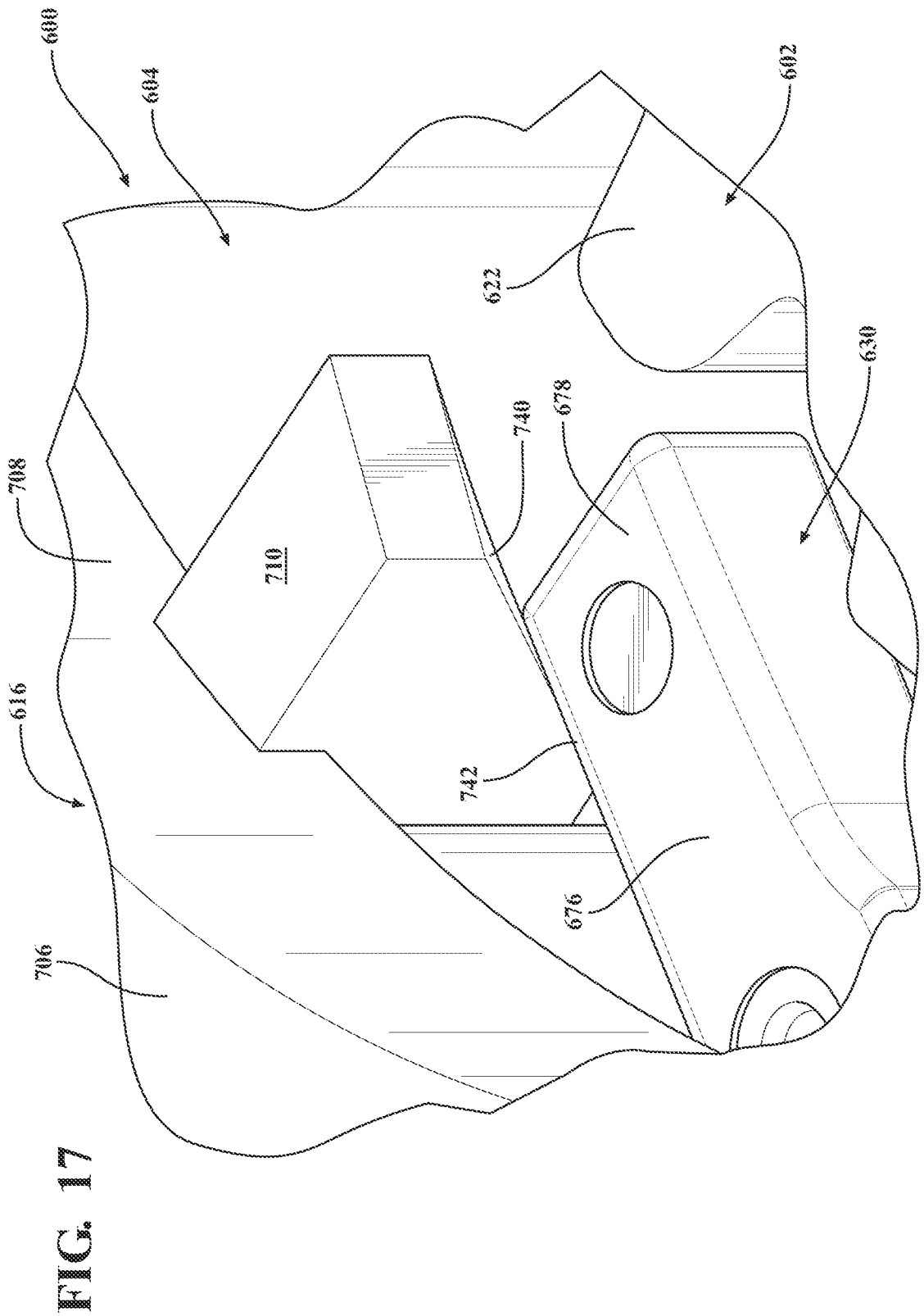
FIG. 17 is another partial isometric view, similar to FIG. 16, but now showing movement of the armature ring toward an actuated position for causing its strut engagement feature to engage the active strut assembly and forcibly pivot the active strut assembly from its non-deployed position toward a deployed position in response to the coil unit being shifted into an energized state.
Figure 18:
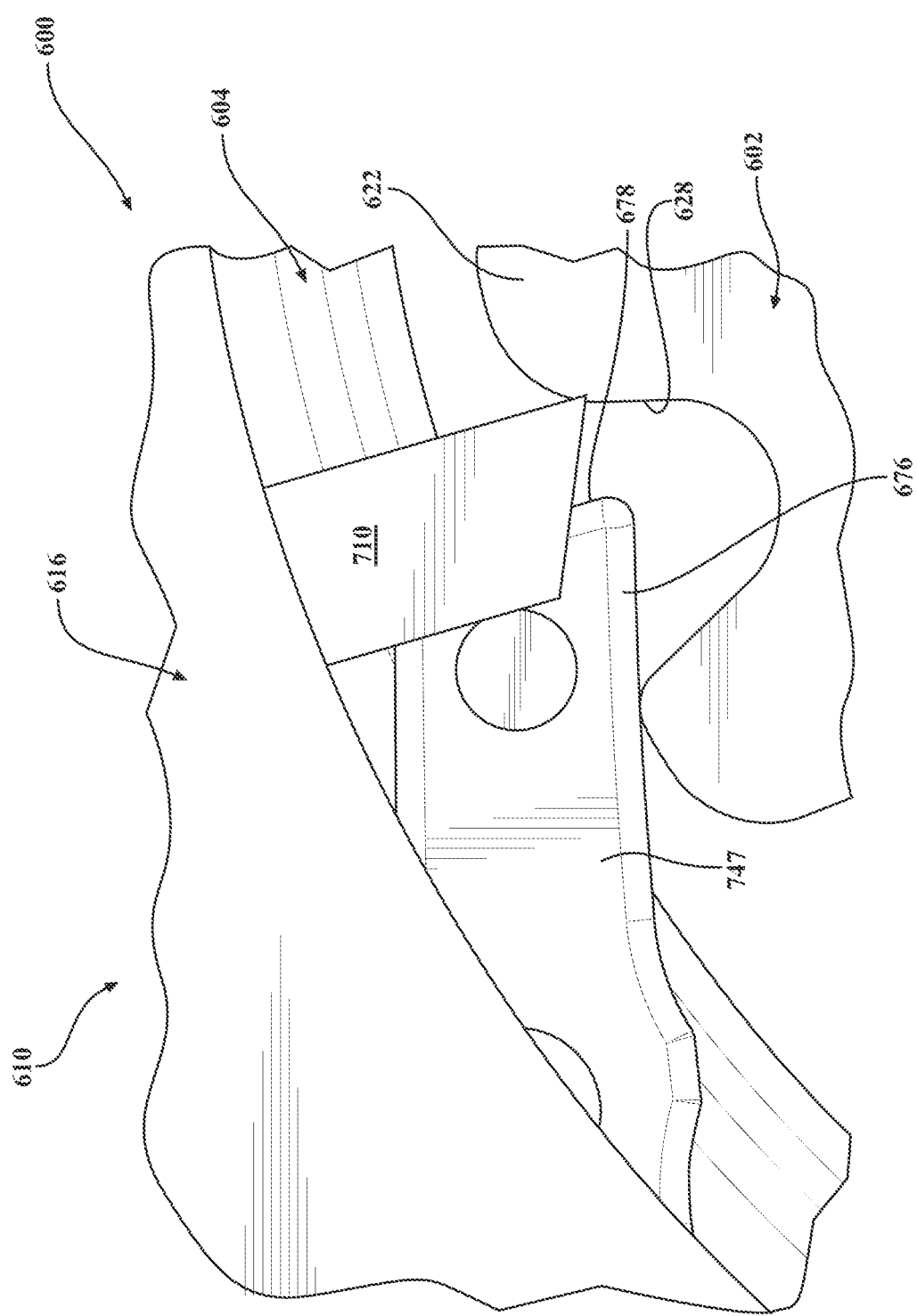
FIG. 18 is a plan view of FIG. 17.

Referring now primarily to FIGS. 16-18, selective actuation on the selectable one-way clutch of bi-directional clutch 600 will be detailed. Specifically, when coil unit 614 is energized, it causes armature ring 616 to initiate movement from its non-actuated position (FIG. 16) toward its actuated position, in opposition to the biasing of return spring 700. Strut actuation lugs 710 on armature ring 616 include a ramped profiled surface 740 selected based on the relationship between the range of axial movement of armature ring 616 and the corresponding arcuate range of pivotal motion of active struts 630 resulting from ramped profiled surface 740 engaging a top surface 742 of actuation leg segment 676 of active strut 630. In FIGS. 16-18, the armature ring 616 and lug 710 moves generally downward in the axial direction, such that the ramped profiled surface 740 will engage the active strut 630 and push it radially inward.

Ramped profile surface 740 is preferably non-linear and may, without limitation, have a helical or arcuate configuration capable of pivotably driving active strut 630 from its non-deployed position to its fully-deployed position as a result of axial movement of armature ring 616 from its non-actuated position to its actuated position. FIG. 17 illustrates engagement of ramped profile surface 740 on strut actuation lug 710 with top surface 742 on active strut 630 causing pivotal movement of active strut 630 in opposition to the biasing of torsion spring 672. As armature ring 616 continues to get closer to coil unit 614, it will continue to pivot active strut 630 toward its fully-deployed position whereat tip segment 678 is locked against surface 628 of ratchet tooth 622. When power is turned off and coil unit 614 is de-energized, torsion spring 700 will forcibly move armature ring 616 axially back to its non-actuated position, thereby releasing clutch assembly 600 from its Lock-Lock mode. In particular, the active strut 630 will be allowed to pivot back to its non-deployed position when the lug 710 moves away from the active strut 630.

While bi-directional clutch assembly 600 is shown to include a passive one-way clutch and a selectable one-way clutch to provide Freewheel/Lock (when active struts 630 are non-deployed) and Lock-Lock (when active struts 630 are deployed) modes of operation, an alternative arrangement could be configured to replace the passive strut assemblies 618 with a pair of second active strut assemblies, in addition to the original pair of first active strut assemblies 620. In such a variant, a second electromagnetic actuator (coil, etc.), operated independently from the first coil unit 614, would be used to selectively actuate the second active struts. In such an alternative variant, the available modes would now include Freewheel, Lock-Lock, Ratchet Clockwise, and Ratchet Counterclockwise, depending on the actuated states of the various active struts. Similar to the arrangement of the passive strut assemblies 618, the additional or second pair of active struts are angled in the opposite direction relative to the original active struts 630, such that the second pair of active struts would lock against rotation in the opposite direction relative to lock direction of the original active struts 630. When all of the active struts are actuated, the Lock-Lock mode is activated. When both pairs are non-actuated, the Freewheel mode is activated. When only one of the pairs is actuated, either the Ratchet Clockwise or Ratchet Counterclockwise is activated, depending on which of pairs is actuated.

Figure 19:
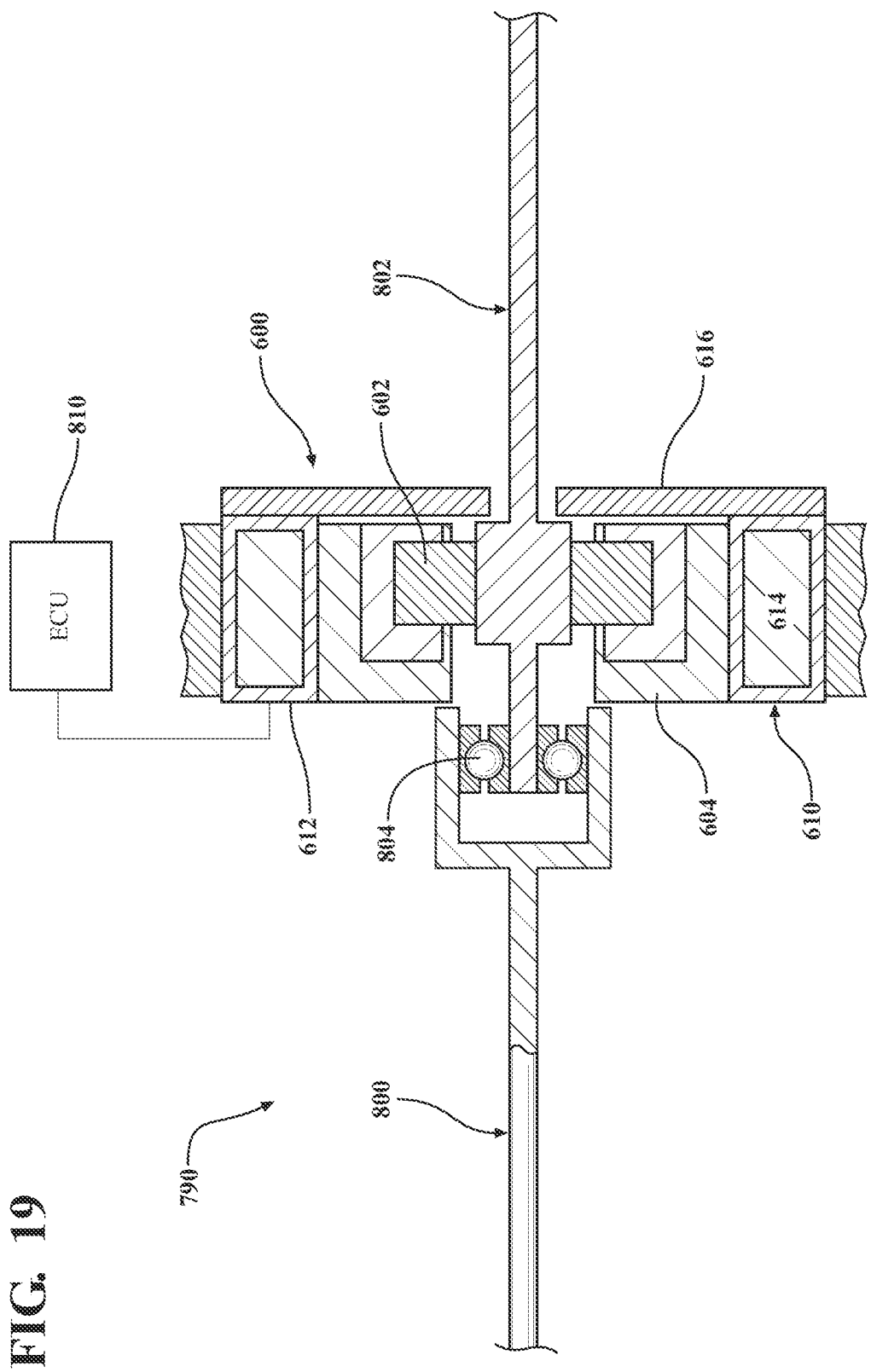
FIG. 19 is a schematic view of the bi-directional clutch assembly of FIGS. 11-18 shown installed between a rotary input member and a rotary output member for providing a freewheeling disconnect feature therebetween.

FIG. 19 is a schematic illustration of a disconnect arrangement 790 with bi-directional clutch assembly 600 operably disposed between a rotary input 800 and a rotary output 802. In this arrangement, inner race 602 is fixed for common rotation with rotary output 802 while outer race 604 is fixed for common rotation with rotary input 800. Bearings 804 support rotary output 802 for rotation relative to rotary input 800 about a common rotary axis. An ECU 810 functions to energize coil unit 614 and cause movement of armature ring 616 when it is desired to establish the Lock-Lock mode. This arrangement is well-suited for use as a disconnect clutch in an axle assembly of the type used in 4WD/AWD vehicles. It will be appreciated that the inner race 602 may be connected to the input with the outer race 604 connected to the output.

Figure 20:
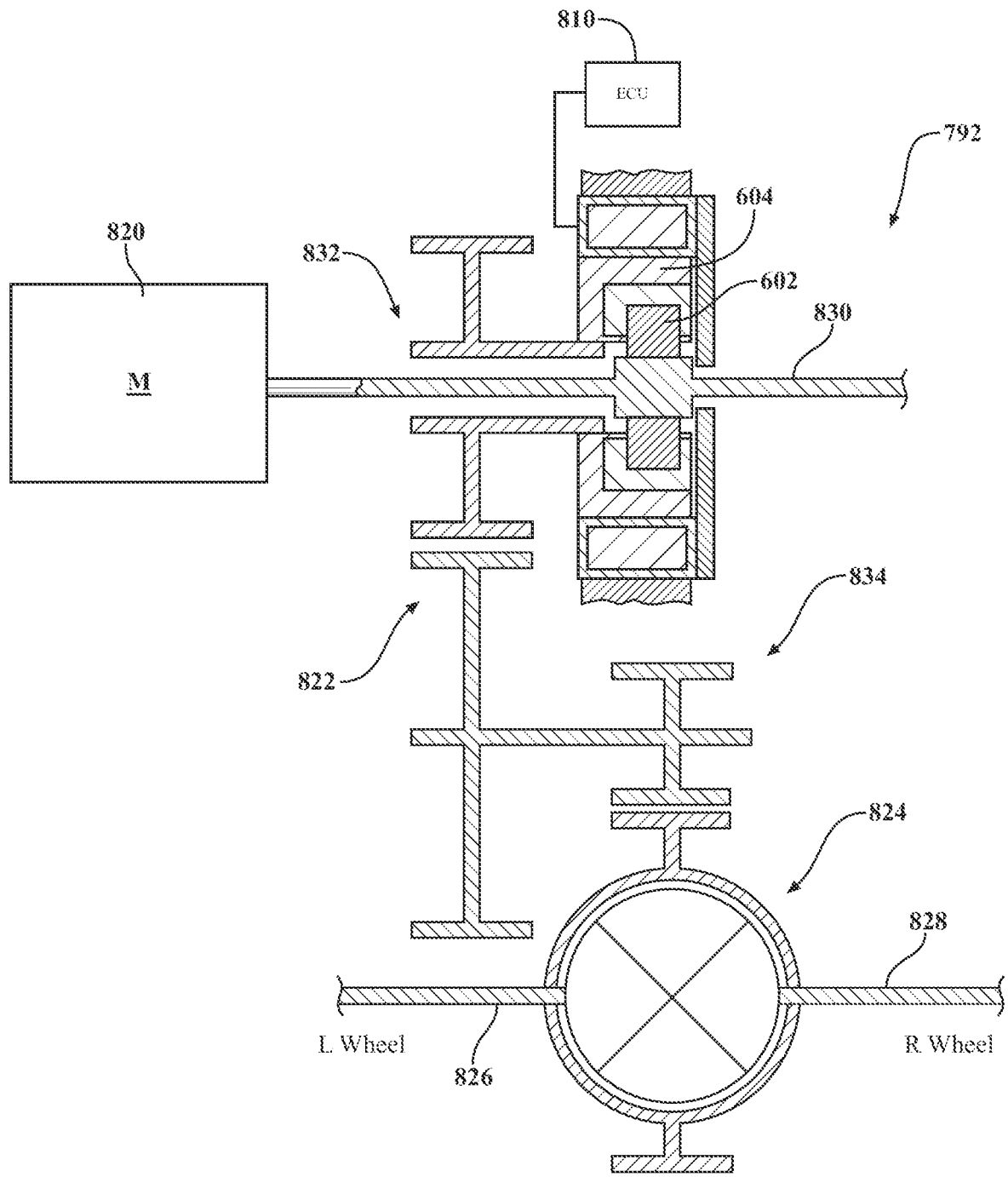
FIG. 20 is a schematic view of the disconnect-type bi-directional clutch assembly of FIGS. 11-19 now installed within an electric drive axle (EDA) assembly.

FIG. 20 is a schematic illustration of an electric drive axle (EDA) assembly 792 for a hybrid/electric vehicle and which generally includes an electric motor 820, a geartrain 822, a differential unit 824, and a pair of axleshafts 826, 828, in addition to bi-directional clutch assembly 600. In this configuration, a motor shaft 830 drives inner race 602 of clutch assembly 600 while outer race 604 drives an input gearset 832 of geartrain 822. An output gearset 834 is driven by input gearset 832 and, in turn, drives differential unit 824 for transferring drive torque to the wheels via axleshafts 826, 828. Geartrain 822 can be a single-speed reduction unit (shown) or a multi-speed variant with clutch assembly 600 disposed in any such variant between motor shaft 830 and input gearset 832 to provide the connect/disconnect function therebetween.

Figure 21:
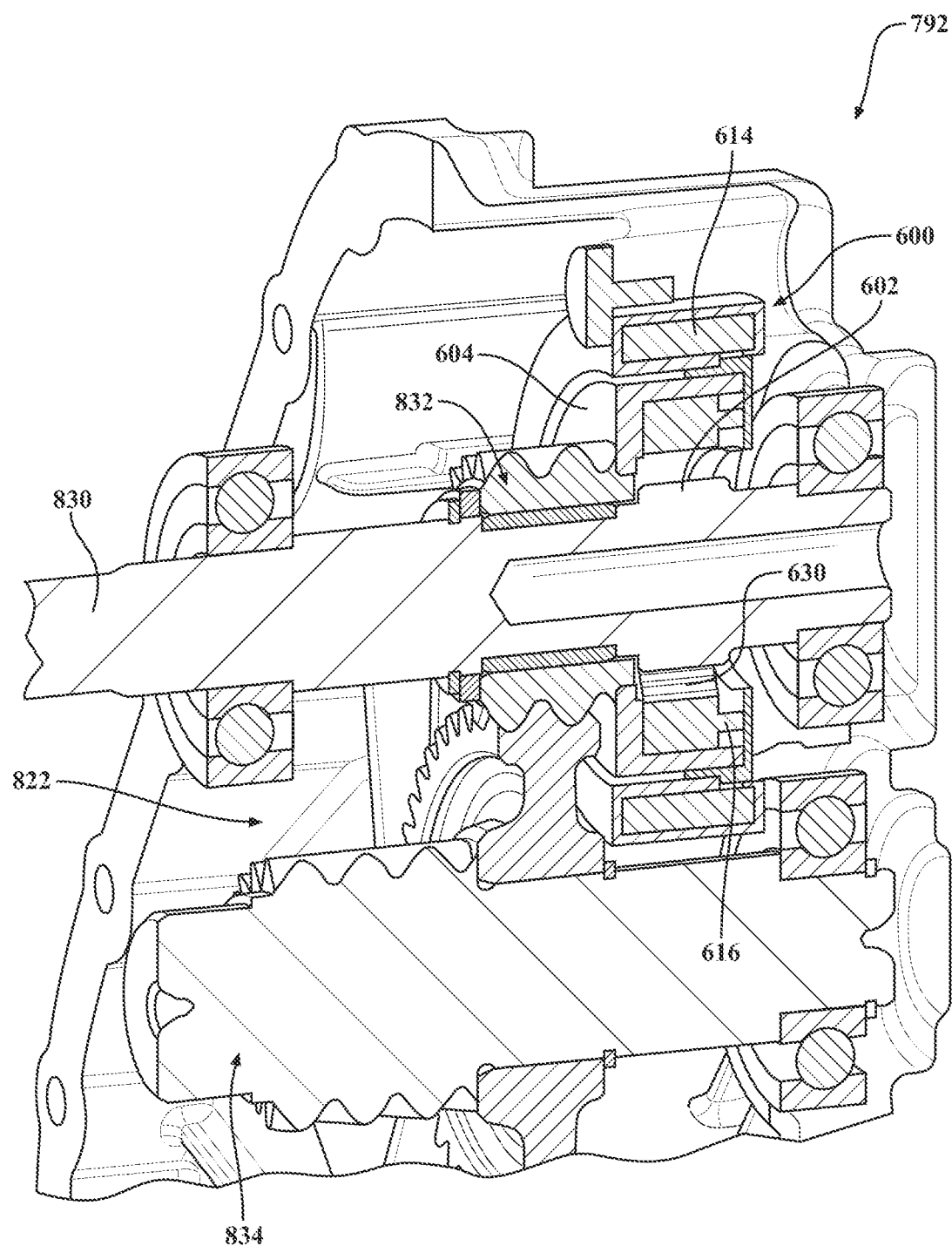
FIG. 21 is a partial isometric view of an arrangement similar to that shown in FIG. 20.

FIG. 21 illustrates a portion of EDA assembly 792. As shown, the inner race 602 may be integrally formed on input shaft 830, such that the teeth 622 will project radially outward from the input shaft 830. In this approach, there is a reduced torque transfer load on the struts 626 and 630, with passive strut engagement due to centrifugal forces being balanced by the torsion strut spring.

Figure 22:
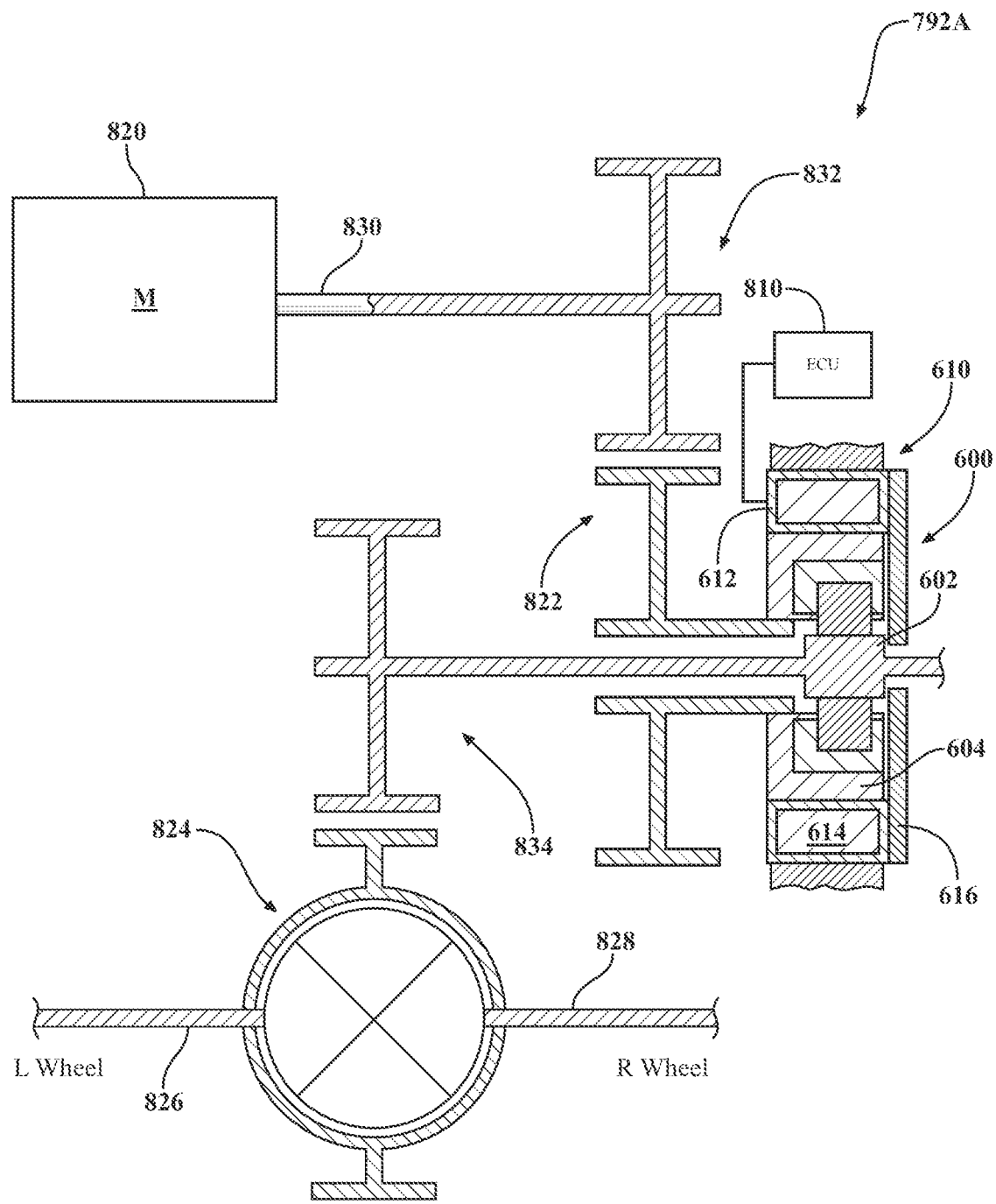
FIG. 22 is another schematic view of the disconnect-type bi-directional clutch assembly of FIGS. 11-19 now installed within another version of an EDA assembly.

FIG. 22 is an alternate embodiment of an electric drive axle assembly 792A. In this arrangement, motor 820 drives first gearset 832 while bi-directional clutch 600 is located between first gearset 832 and second gearset 834 of geartrain. In this arrangement, outer race 604 acts as the input member while inner race 602 acts as the output member driving second gearset 834 which, in turn, drives differential unit 824. The inner race 602 may be integrally formed with the output member driving the second gearset 834, with the teeth projecting radially outward from the output member driving the second gearset 834. When torque is transferred from the first gearset 832 to the second gearset 834, the gearsets operate as a gear reduction mechanism as illustrated. In the illustrated aspect, the bi-directional clutch 600 is attached to an intermediate shaft rather than the input shaft 830 from the motor 820.

Figure 23:
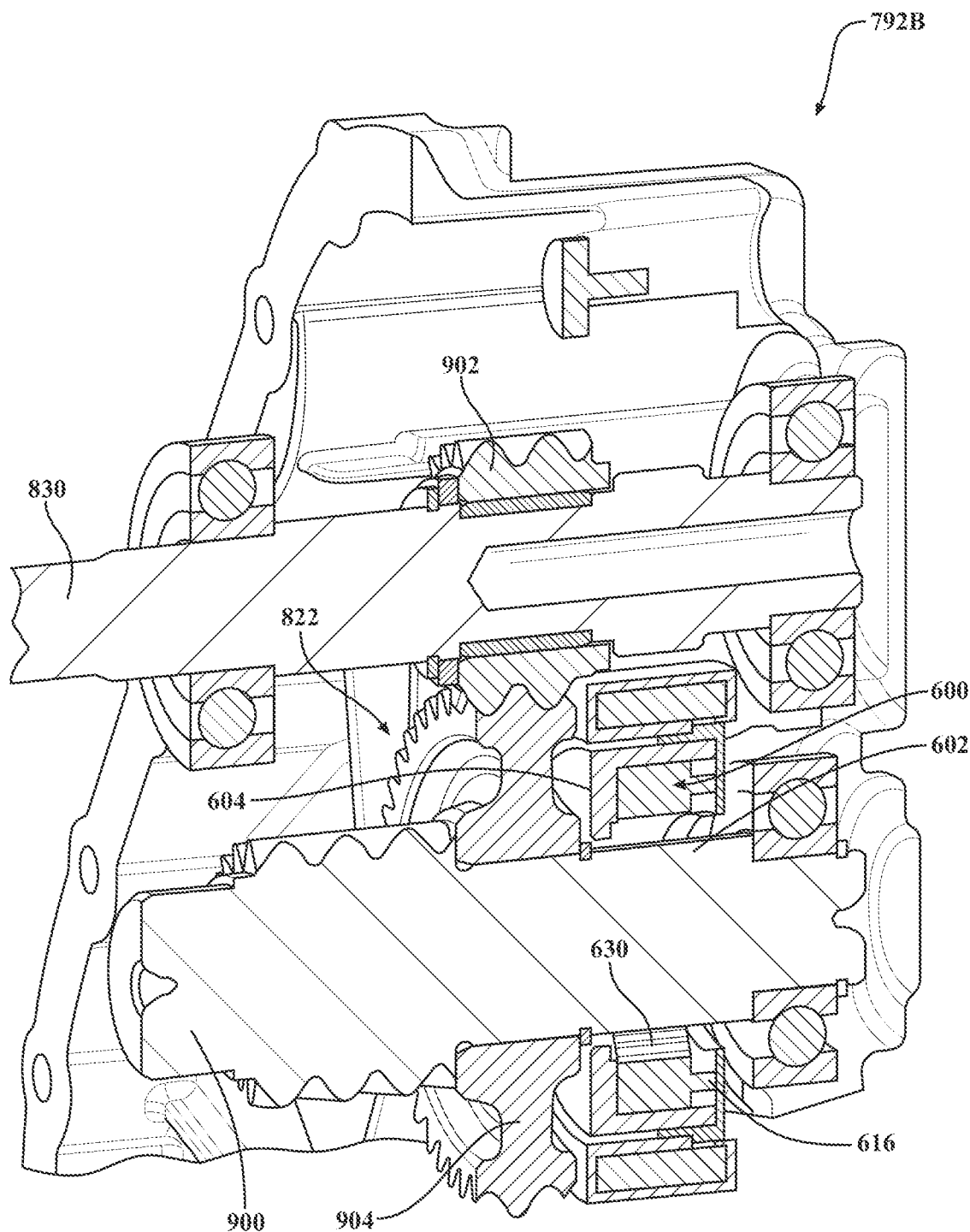
FIG. 23 is a partial isometric view of an arrangement similar to that shown in FIG. 22.

Finally, FIG. 23 illustrates yet another variant of an E-drive assembly 792B having an input shaft 830, a gearset 822, an intermediate shaft 900, and bi-directional clutch assembly 600. Gearset 822 includes a drive gear 902 fixed to input shaft 830 and a driven gear 904 rotatably supported on intermediate shaft 900. Inner race 602 is fixed to intermediate shaft 900 while outer race 604 is fixed for rotation with driven gear 904. This is another example of the bi-directional clutch 600 being disposed on an intermediate shaft rather the shaft that is driven by the motor 820.

When disposed on an intermediate shaft, there may be a reduced rotational speed, and therefore reduced centrifugal forces, but with a higher torque transfer load on the struts. However, the bi-directional clutch 600 will still operate effectively. These variants are shown to detail the various alternative arrangements provided by bi-directional clutch 600. it will be appreciated that the bi-directional clutch 600 may be disposed at other shafts and in other systems to performing clutch actuation as desired.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed:

1. A bi-directional clutch assembly comprising:
a rotary input;
a rotary output;
an outer race fixed for rotation about an axis with one of the input and the output and defining first and second strut pockets;
an inner race fixed for rotation with the other of the input and the output and defining ratchet teeth;
a passive one-way clutch including at least two passive struts each supported in a corresponding first strut pocket for pivotal movement relative to the ratchet teeth;
passive strut springs for normally biasing the passive struts into engagement with the ratchet teeth on the inner race; and
a selectable one-way clutch including at least one active strut supported in a corresponding second strut pocket for pivotal movement between a non-deployed position disengaged from the ratchet teeth and a deployed position engaged with the ratchet teeth, wherein the at least one active strut is biased toward the non-deployed position;
an axially moveable armature ring moveable along the axis between a non-actuated position and an actuated position, wherein movement of the armature ring to the actuated position causes movement of the at least one active strut to the deployed position.

2. The assembly of claim 1, further comprising an annular coil unit fixed to a stationary member, wherein the armature ring moves axially to the actuated position in response to energization of the annular coil unit.

3. The assembly of claim 2, wherein the armature ring is fixed for rotation with the outer race.

4. The assembly of claim 3, wherein the armature ring includes a strut engagement feature, wherein the strut engagement feature is configured to contact the at least one active strut in response to movement of the armature ring to the actuated position, wherein contact by the strut engagement feature with the at least one active strut causes the active strut to move to the deployed position.

5. The assembly of claim 4, wherein the armature ring includes a ring segment overlying the coil unit and a flange segment, wherein the strut engagement feature is attached to the flange segment.

6. The assembly of claim 4, wherein the strut engagement feature includes a ramped surface configured to contact the at least one active strut.

7. The assembly of claim 2, wherein the coil unit is disposed radially outward from the outer race.

8. The assembly of claim 1, wherein the at least one active strut in the deployed position blocks relative rotation between the inner race and the outer race in a first direction, and the passive struts block relative rotation between the inner race and the outer race in a second direction that is opposite the first direction to define a Locked/Locked mode of operation.

9. The assembly of claim 8, wherein the at least one active strut in the non-deployed position defines a Freewheel/Locked mode of operation, where the passive struts block relative rotation in the second direction and allow relative rotation in the first direction.

10. The assembly of claim 1, wherein the at least one active strut includes a corresponding active strut spring for biasing the at least one active strut to the non-deployed position.

11. The assembly of claim 1 wherein the passive strut spring is offset relative to a pivot axis of the passive strut to provide a tail-heavy configuration.

12. The assembly of claim 1, wherein the armature ring is biased toward the non-actuated position.

13. A method of operating a bi-directional clutch assembly, the method comprising the steps of:
energizing an annular coil, wherein the annular coil extends circumferentially about an axis;
moving an armature ring axially along the axis from a non-actuated position to an actuated position in response to energizing the annular coil;
contacting at least one active strut with a strut engagement feature of the armature ring and, in response thereto, pivoting the at least one active strut from a non-deployed position into a deployed position in which the active strut engages ratcheting teeth of an inner race;
wherein the active strut is supported in an active strut pocket formed in an outer race for pivotal movement between the deployed position and the non-deployed position;
wherein, in the deployed position, the at least one active strut blocks relative rotation about the axis between the inner race and the outer race in a first direction;
wherein the bi-directional clutch assembly further includes at least two passive struts supported in passive strut pockets formed in the outer race and biased into engagement with the ratcheting teeth, wherein the at least two passive struts block relative rotation between the inner race and the outer race in a second direction that is opposite the first direction;
wherein, when the at least one active strut is in the deployed position, the bi-directional clutch assembly is a Locked/Locked mode of operation in which relative rotation is blocked in both the first and second direction, and when the at least one active strut is in the non-deployed position, the bi-directional clutch assembly is in a Freewheel/Locked mode of operation in which relative rotation is blocked in the second direction by the passive struts and allowed in the first direction.

14. The method of claim 13, further comprising de-energizing the annular coil and, in response thereto, moving the armature from the actuated position to the non-actuated position, wherein the armature is biased toward the non-actuated position, and pivoting the at least one active strut from the deployed position to the non-deployed position, wherein the at least one active strut is biased toward the non-deployed position.

15. The method of claim 13, wherein the armature is fixed for rotation to the outer race, and the annular coil is fixed to a stationary member.

* * * * *